United States Patent
Demers

(10) Patent No.: US 6,700,586 B1
(45) Date of Patent: Mar. 2, 2004

(54) LOW COST GRAPHICS WITH STITCHING PROCESSING HARDWARE SUPPORT FOR SKELETAL ANIMATION

(75) Inventor: Eric Demers, Redwood City, CA (US)

(73) Assignee: Nintendo Co., Ltd., Kyoto (JP)

( * ) Notice: Subject to any disclaimer, the term of this patent is extended or adjusted under 35 U.S.C. 154(b) by 273 days.

(21) Appl. No.: 09/722,390

(22) Filed: Nov. 28, 2000

Related U.S. Application Data
(60) Provisional application No. 60/226,914, filed on Aug. 23, 2000.

(51) Int. Cl.[7] .......................... G09G 5/00; G06T 15/70
(52) U.S. Cl. ........................ 345/588; 345/474
(58) Field of Search ................. 345/581–589, 345/473–475

(56) References Cited

U.S. PATENT DOCUMENTS

| | | |
|---|---|---|
| 4,275,413 A | 6/1981 | Sakamoto et al. |
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,615,013 A | 9/1986 | Yan et al. |

(List continued on next page.)

FOREIGN PATENT DOCUMENTS

| | | |
|---|---|---|
| CA | 2070934 | 12/1993 |
| EP | 0 637 813 A2 | 2/1995 |
| EP | 1 074 945 | 2/2001 |
| EP | 1 075 146 | 2/2001 |
| EP | 1 081 649 | 3/2001 |

(List continued on next page.)

OTHER PUBLICATIONS

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

(List continued on next page.)

*Primary Examiner*—Matthew C. Bella
*Assistant Examiner*—Anthony J Blackman
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. An additional matrix multiplication computation unit connected in cascade with a modelview matrix computation unit can support a piecewise linear version of skinning for skeletal animation modeling. The normalizer connected between the cascaded matrix multiplication computation units can provide normalization to avoid distorted visualization. The additional matrix multiplication computation unit can be used for applications other than skeletal animation modeling (e.g., environment mapping).

8 Claims, 11 Drawing Sheets

(1 of 11 Drawing Sheet(s) Filed in Color)

U.S. PATENT DOCUMENTS

| | | |
|---|---|---|
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,428,717 A * | 6/1995 | Glassner ..................... 345/423 |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,721,947 A | 2/1998 | Priem et al. |
| 5,724,561 A | 3/1998 | Tarolli et al. |

| | | | | | |
|---|---|---|---|---|---|
| 5,726,689 A | 3/1998 | Negishi et al. | 5,870,102 A | 2/1999 | Tarolli et al. |
| 5,726,947 A | 3/1998 | Yamazaki et al. | 5,870,109 A | 2/1999 | McCormack et al. |
| 5,727,192 A | 3/1998 | Baldwin | 5,870,587 A | 2/1999 | Danforth et al. |
| 5,734,386 A | 3/1998 | Cosman | 5,872,902 A | 2/1999 | Kuchkuda et al. |
| 5,739,819 A | 4/1998 | Bar-Nahum | 5,874,969 A | 2/1999 | Storm et al. |
| 5,740,343 A | 4/1998 | Tarolli et al. | 5,877,741 A | 3/1999 | Chee et al. |
| 5,740,383 A | 4/1998 | Nally et al. | 5,877,770 A | 3/1999 | Hanaoka |
| 5,740,406 A | 4/1998 | Rosenthal et al. | 5,877,771 A | 3/1999 | Drebin et al. |
| 5,742,749 A | 4/1998 | Foran et al. | 5,880,736 A | 3/1999 | Peercy et al. |
| 5,742,788 A | 4/1998 | Priem et al. | 5,880,737 A | 3/1999 | Griffen et al. |
| 5,745,118 A | 4/1998 | Alcorn et al. | 5,883,638 A | 3/1999 | Rouet et al. |
| 5,745,125 A | 4/1998 | Deering et al. | 5,886,701 A | 3/1999 | Chauvin et al. |
| 5,748,199 A | 5/1998 | Palm | 5,886,705 A | 3/1999 | Lentz |
| 5,748,986 A | 5/1998 | Butterfield et al. | 5,887,155 A | 3/1999 | Laidig |
| 5,751,291 A | 5/1998 | Olsen et al. | 5,890,190 A | 3/1999 | Rutman |
| 5,751,292 A | 5/1998 | Emmot | 5,892,517 A | 4/1999 | Rich |
| 5,751,295 A | 5/1998 | Becklund et al. | 5,892,974 A | 4/1999 | Koizumi et al. |
| 5,751,930 A | 5/1998 | Katsura et al. | 5,894,300 A | 4/1999 | Takizawa |
| 5,754,191 A | 5/1998 | Mills et al. | 5,900,881 A | 5/1999 | Ikedo |
| 5,757,382 A | 5/1998 | Lee | 5,903,283 A | 5/1999 | Selwan et al. |
| 5,758,182 A | 5/1998 | Rosenthal et al. | 5,909,218 A | 6/1999 | Naka et al. |
| 5,760,783 A | 6/1998 | Migdal et al. | 5,909,225 A | 6/1999 | Schinnerer et al. |
| 5,764,228 A | 6/1998 | Baldwin | 5,912,675 A | 6/1999 | Laperriere |
| 5,764,237 A | 6/1998 | Kaneko | 5,912,676 A | 6/1999 | Malladi et al. |
| 5,764,243 A | 6/1998 | Baldwin | 5,914,721 A | 6/1999 | Lim |
| 5,767,856 A | 6/1998 | Peterson et al. | 5,914,725 A | 6/1999 | Mcinnnis et al. |
| 5,767,858 A | 6/1998 | Kawase et al. | 5,914,729 A | 6/1999 | Lippincott |
| 5,768,626 A | 6/1998 | Munson et al. | 5,917,496 A | 6/1999 | Fujita et al. |
| 5,768,629 A | 6/1998 | Wise et al. | 5,920,326 A | 7/1999 | Rentschler et al. |
| 5,774,133 A | 6/1998 | Neave et al. | 5,920,876 A | 7/1999 | Ungar et al. |
| 5,777,623 A | 7/1998 | Small | 5,923,332 A | 7/1999 | Izawa |
| 5,777,629 A | 7/1998 | Baldwin | 5,923,334 A | 7/1999 | Luken |
| 5,781,927 A | 7/1998 | Wu et al. | 5,926,182 A | 7/1999 | Menon et al. |
| 5,791,994 A | 8/1998 | Hirano et al. | 5,926,647 A | 7/1999 | Adams et al. |
| 5,798,770 A | 8/1998 | Baldwin | 5,933,150 A | 8/1999 | Ngo et al. |
| 5,801,706 A | 9/1998 | Fujita et al. | 5,933,154 A | 8/1999 | Howard et al. |
| 5,801,711 A | 9/1998 | Koss et al. | 5,933,155 A | 8/1999 | Akeley |
| 5,801,716 A | 9/1998 | Silverbrook | 5,933,529 A | 8/1999 | Kim |
| 5,801,720 A | 9/1998 | Norrod et al. | 5,936,641 A | 8/1999 | Jain et al. |
| 5,805,175 A | 9/1998 | Priem | 5,936,683 A | 8/1999 | Lin |
| 5,805,868 A | 9/1998 | Murphy | 5,940,086 A | 8/1999 | Rentschler et al. |
| 5,808,619 A | 9/1998 | Choi et al. | 5,940,089 A | 8/1999 | Dilliplane |
| 5,808,630 A | 9/1998 | Pannell | 5,940,538 A | 8/1999 | Spiegel et al. |
| 5,809,219 A | 9/1998 | Pearce et al. | 5,943,058 A | 8/1999 | Nagy |
| 5,809,278 A | 9/1998 | Watanabe et al. | 5,943,060 A | 8/1999 | Cosman et al. |
| 5,815,165 A | 9/1998 | Blixt | 5,945,997 A | 8/1999 | Zhao et al. |
| 5,815,166 A | 9/1998 | Baldwin | 5,949,421 A | 9/1999 | Ogletree et al. |
| 5,818,456 A | 10/1998 | Cosman et al. | 5,949,423 A | 9/1999 | Olsen |
| 5,819,017 A | 10/1998 | Akeley et al. | 5,949,424 A | 9/1999 | Cabral et al. |
| 5,821,940 A | 10/1998 | Morgan et al. | 5,949,428 A | 9/1999 | Toelle et al. |
| 5,821,949 A | 10/1998 | Deering | 5,949,440 A | 9/1999 | Krech, Jr. et al. |
| 5,822,516 A | 10/1998 | Krech, Jr. | 5,956,042 A | 9/1999 | Tucker et al. |
| 5,828,382 A | 10/1998 | Wilde | 5,956,043 A | 9/1999 | Jensen |
| 5,828,383 A | 10/1998 | May et al. | 5,958,020 A | 9/1999 | Evoy et al. |
| 5,828,907 A | 10/1998 | Wise et al. | 5,959,640 A | 9/1999 | Rudin et al. |
| 5,831,624 A | 11/1998 | Tarolli et al. | 5,963,220 A | 10/1999 | Lee et al. |
| 5,831,625 A | 11/1998 | Rich et al. | 5,966,134 A | 10/1999 | Arias |
| 5,831,640 A | 11/1998 | Wang et al. | 5,969,726 A | 10/1999 | Rentschler et al. |
| 5,835,096 A | 11/1998 | Baldwin | 5,977,979 A | 11/1999 | Clough et al. |
| 5,835,792 A | 11/1998 | Wise et al. | 5,977,984 A | 11/1999 | Omori |
| 5,838,334 A | 11/1998 | Dye | 5,982,376 A | 11/1999 | Abe et al. |
| 5,844,576 A | 12/1998 | Wilde et al. | 5,982,390 A | 11/1999 | Stoneking et al. |
| 5,850,229 A * | 12/1998 | Edelbrunner et al. ....... 345/473 | 5,986,659 A | 11/1999 | Gallery et al. |
| 5,852,451 A | 12/1998 | Cox et al. | 5,986,663 A | 11/1999 | Wilde |
| 5,856,829 A | 1/1999 | Gray, III et al. | 5,986,677 A | 11/1999 | Jones et al. |
| 5,859,645 A | 1/1999 | Latham | 5,987,567 A | 11/1999 | Rivard et al. |
| 5,861,888 A | 1/1999 | Dempsey | 5,990,903 A | 11/1999 | Donovan |
| 5,861,893 A | 1/1999 | Strugess | 5,995,120 A | 11/1999 | Dye |
| 5,867,166 A | 2/1999 | Myhrvold et al. | 5,995,121 A | 11/1999 | Alcokrn et al. |
| 5,870,097 A | 2/1999 | Snyder et al. | 5,999,189 A | 12/1999 | Kajiya et al. |
| 5,870,098 A | 2/1999 | Gardiner | 5,999,196 A | 12/1999 | Storm et al. |

| | | |
|---|---|---|
| 5,999,198 A | 12/1999 | Horan et al. |
| 6,002,407 A | 12/1999 | Fadden |
| 6,002,409 A | 12/1999 | Harkin |
| 6,002,410 A | 12/1999 | Battle |
| 6,005,582 A | 12/1999 | Gabriel et al. |
| 6,005,583 A | 12/1999 | Morrison |
| 6,005,584 A | 12/1999 | Kitamura et al. |
| 6,007,428 A | 12/1999 | Nishiumi et al. |
| 6,008,820 A | 12/1999 | Chauvin et al. |
| 6,011,562 A | 1/2000 | Gagne et al. |
| 6,011,565 A | 1/2000 | Kuo et al. |
| 6,014,144 A | 1/2000 | Nelson et al. |
| 6,016,150 A | 1/2000 | Lengyel et al. |
| 6,016,151 A | 1/2000 | Lin |
| 6,018,350 A | 1/2000 | Lee et al. |
| 6,020,931 A | 2/2000 | Bilbrey et al. |
| 6,021,417 A | 2/2000 | Massarksy |
| 6,022,274 A | 2/2000 | Takeda et al. |
| 6,023,261 A | 2/2000 | Ugajin |
| 6,023,738 A | 2/2000 | Priem et al. |
| 6,025,853 A | 2/2000 | Baldwin |
| 6,026,182 A | 2/2000 | Lee et al. |
| 6,028,608 A | 2/2000 | Jenkins |
| 6,028,611 A | 2/2000 | Anderson et al. |
| 6,031,542 A | 2/2000 | Wittig |
| 6,035,360 A | 3/2000 | Doidge et al. |
| 6,037,948 A | 3/2000 | Liepa |
| 6,037,949 A | 3/2000 | DeRose et al. |
| 6,038,031 A | 3/2000 | Murphy |
| 6,038,348 A | 3/2000 | Carley |
| 6,040,843 A | 3/2000 | Monroe et al. |
| 6,040,844 A | 3/2000 | Yamaguchi et al. |
| 6,041,010 A | 3/2000 | Puar et al. |
| 6,043,804 A | 3/2000 | Greene |
| 6,043,821 A | 3/2000 | Sprague et al. |
| 6,046,746 A | 4/2000 | Deering |
| 6,046,747 A | 4/2000 | Saunders et al. |
| 6,046,752 A | 4/2000 | Kirkland et al. |
| 6,049,337 A | 4/2000 | Van Overveld |
| 6,049,338 A | 4/2000 | Anderson et al. |
| 6,052,125 A | 4/2000 | Gardiner et al. |
| 6,052,126 A | 4/2000 | Sakuraba et al. |
| 6,052,127 A | 4/2000 | Vaswani et al. |
| 6,052,129 A | 4/2000 | Fowler et al. |
| 6,052,133 A | 4/2000 | Kang |
| 6,054,993 A | 4/2000 | Devic et al. |
| 6,054,999 A | 4/2000 | Strandberg |
| 6,057,847 A | 5/2000 | Jenkins |
| 6,057,849 A | 5/2000 | Haubner et al. |
| 6,057,851 A | 5/2000 | Luken et al. |
| 6,057,852 A | 5/2000 | Krech, Jr. |
| 6,057,859 A | 5/2000 | Handelman et al. |
| 6,057,861 A | 5/2000 | Lee et al. |
| 6,057,862 A | 5/2000 | Margulis |
| 6,057,863 A | 5/2000 | Olarig |
| 6,061,462 A | 5/2000 | Tostevin et al. |
| 6,064,392 A | 5/2000 | Rohner |
| 6,067,098 A | 5/2000 | Dye |
| 6,070,204 A | 5/2000 | Poisner |
| 6,072,496 A | 6/2000 | Guenter et al. |
| 6,075,543 A | 6/2000 | Akeley |
| 6,075,546 A | 6/2000 | Hussain et al. |
| 6,078,311 A | 6/2000 | Pelkey |
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,124 A | 7/2000 | Priem et al. |
| 6,092,158 A | 7/2000 | Harriman et al. |
| 6,094,200 A | 7/2000 | Olsen et al. |
| 6,097,435 A | 8/2000 | Stanger et al. |
| 6,097,437 A | 8/2000 | Hwang |
| 6,104,415 A | 8/2000 | Gossett |
| 6,104,417 A | 8/2000 | Nielsen et al. |
| 6,105,094 A | 8/2000 | Lindeman |
| 6,108,743 A | 8/2000 | Debs et al. |
| 6,111,582 A | 8/2000 | Jenkins |
| 6,111,584 A | 8/2000 | Murphy |
| 6,115,047 A | 9/2000 | Deering |
| 6,115,049 A | 9/2000 | Winner et al. |
| 6,118,462 A | 9/2000 | Margulis |
| 6,128,026 A | 10/2000 | Brothers, III |
| 6,144,365 A | 11/2000 | Young et al. |
| 6,144,387 A | 11/2000 | Liu et al. |
| 6,151,602 A | 11/2000 | Hejlsberg et al. |
| 6,155,926 A | 12/2000 | Miyamoto et al. |
| 6,157,387 A | 12/2000 | Kotani |
| 6,166,748 A | 12/2000 | Van Hook et al. |
| 6,172,678 B1 | 1/2001 | Shiraishi |
| 6,173,367 B1 | 1/2001 | Aleksic et al. |
| 6,177,944 B1 | 1/2001 | Fowler et al. |
| 6,181,352 B1 | 1/2001 | Kirk et al. |
| 6,191,794 B1 | 2/2001 | Priem et al. |
| 6,198,488 B1 | 3/2001 | Lindholm et al. |
| 6,200,253 B1 | 3/2001 | Nishiumi et al. |
| 6,204,851 B1 | 3/2001 | Netschke et al. |
| 6,215,496 B1 | 4/2001 | Szeliski et al. |
| 6,215,497 B1 | 4/2001 | Leung |
| 6,226,012 B1 | 5/2001 | Priem et al. |
| 6,226,713 B1 | 5/2001 | Mehrotra |
| 6,232,981 B1 | 5/2001 | Gossett |
| 6,236,413 B1 | 5/2001 | Gossett et al. |
| 6,239,810 B1 | 5/2001 | Van Hook et al. |
| 6,252,608 B1 | 6/2001 | Snyder et al. |
| 6,252,610 B1 | 6/2001 | Hussain |
| 6,264,558 B1 | 7/2001 | Nishiumi et al. |
| 6,268,861 B1 | 7/2001 | Sanz-Pastor et al. |
| 6,275,235 B1 | 8/2001 | Morgan, III |
| 6,285,779 B1 | 9/2001 | Lapidous et al. |
| 6,292,194 B1 | 9/2001 | Powll, III |
| 6,317,130 B1 * | 11/2001 | Ishikawa et al. ............ 345/473 |
| 6,331,856 B1 | 12/2001 | Van Hook et al. |
| 6,339,428 B1 | 1/2002 | Fowler et al. |
| 6,342,892 B1 | 1/2002 | Van Hook et al. |
| 6,353,438 B1 | 3/2002 | Van Hook |
| 6,356,497 B1 | 3/2002 | Puar et al. |
| 6,408,362 B1 | 6/2002 | Arimilli et al. |
| 6,417,858 B1 | 7/2002 | Bosch et al. |
| 6,426,747 B1 | 7/2002 | Hoppe et al. |
| 6,437,781 B1 | 8/2002 | Tucker et al. |
| 6,459,429 B1 | 10/2002 | Deering |
| 6,466,223 B1 | 10/2002 | Dorbie et al. |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |

FOREIGN PATENT DOCUMENTS

| | | |
|---|---|---|
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |

| | | |
|---|---|---|
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

White paper, Spitzer, John, et al., "Using GL_NV_array_range and GL_NV_Fence on GEForce Products and Beyond" (Aug. 1, 2000).

White paper, Rogers, Douglas H., "Optimizing Direct3D for the GeForce 256" (Jan. 3, 2000).

Hook, Brian, "An Incomplete Guide to Programming DirectDraw and Direct3D Immediate Mode (Release 0.46)," printed from web site: wwww.wksoftware.com, 42 pages.

Thompson, Tom, "Must–See 3–D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 97).

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. application Ser. No. 09/337,293, filed Jun. 21, 1999, Multi–Format Vertex Data Processing Apparatus and Method [issued as U.S. Pat. No. 6,501,479 B1 on Dec. 31, 2002].

Datasheet, SGS–Thomson Microelectronics, nVIDIA™, RIVA 128™ 128–Bit 3D Multimedia Accelerator (Oct. 1997).

Product Presentation, "RIVA128™ Leadership 3D Acceleration," 2 pages.

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha–channel Transparency," Jan. 15, 1999, wysiwyg://16/http://www4.zdnet.com...ies/reviews/0,4161,2188286,00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d...penGL/advanced98/notes/node41.html, Jun. 11, 1998.

10.2 Alpha Blending, http:///www.sgi.com/software/opengl/advanced98/notes/node146.html.

10.3 Sorting, http://www.sig.com/software/opengl/advanced98/notes/node174.html.

10.4 Using the Alpha Function, http://www.sgi.com/software/opengl/advanced98/notes/node148.html.

Winner, Stephanie, et al., "Hardware Accelerated Rendering Of Antialiasing Using a Modifed A–buffer Algorithm," Computer Graphics Proceedings, Annual Conference Series, 1997, pp. 307–316.

Debevec, Paul, et al., "Efficient View–Dependent Image–Based Rendering with Projective Texture–Mapping," University of Claifornia at Berkeley.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp. 249–252 (Jul. 1992).

White Paper, Kilgard, Mark J., "Improving Shadows and Reflections via the Stencil Buffer" (Nov. 3, 1999).

"OpenGL Projected Textures," from web site: http://reality.sgi.com, 5 pages.

"5.13.1 How to Project a Texture," from web site: www.sgi.com, 2 pages.

Arkin, Alan, email, subject: "Texture distortion problem" from web site: http://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceedings), vol. 12, No. 3, pp. 270–274 (Aug. 1978).

Woo et al., "A Survey of Shadow Algorithms," IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al, "Algorithms for Antialiased Cast Shadows", Computers and Grphics, vol. 9, No. 3, pp. 260–265 (1985).

Michael McCool, "Shadow Volume Reconstruction from Depth Maps", ACM Transactions of Graphics, vol. 19, No. 1, Jan. 2000, pp. 1–26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation an DOTPRODUCT3 Texture Blending" (Dec. 16, 1999).

Peter J. Kovach, Inside Direct 3D, "Alpha Testing," pp. 289–291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics 1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp. 131–137.

Haeberli, Paul et al., "Texture Mapping as a Fundamental Drawing Primitive," Proceedings of the Fourth Eurographics Workshop on Rendering, 11 pages, Paris, France (Jun. 1993).

Schlechtweg, Stefan et al., "Emphasising in Line–drawings," Norsk samarbeid innen grafisk databehandling: NORSIGD Info, medlemsblad for NORSIGD, Nr 1/95, pp. 9–10.

Markosian, Lee et al., "Real–Time Nonphotorealtistic Rendering," Brown University site of the NSF Science and Technology Center for Computer Graphics and Scientific Visualization, Providence, RI, 5 pages (undated).

Feth, Bill, "Non–Photorealistic Rendering," wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.–Mar. 1998.

Zeleznik, Robert et al. "Sketch: An Interface for Sketching 3D Scenes," Computer Graphics Proceedings, Annual Conference Series 1996, pp. 163–170.

Computer Graphics World, Dec. 1997.

Reynolds, Craig, "Stylized Depiction in Computer Graphics, Non–Photorealisic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages. Jun. 1998, http://www.pixar.com/products/renderman/toolkit/Toolkit/AppNotes/appnotet.24.html.

Decaudin, Philippe, "Cartoon–Looking Rendering of 3D Scenes," Syntim Project Inria, 6 pages, http://wwwsyntim.inria.fr/syntim/recherche/decaudin/cartoon–eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.didimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.camani.co.uk/casweb/products/software/SceneIII.htm.

Mulligan, Vikram, "Toon, " info sheet, 2 pages, http://digitalcarverguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar.

NVIDIA.com technical presentation, "AGDC Per–Pixel Shading" (Nov. 15, 2000).

NVIDIA.com technical presentation, Introduction to DX8 Pixel Shaders (Nov. 10, 2000).

NVIDIA.com technical presentation, "Advanced Pixel Shader Details" (Nov. 10, 2000).

"Developer's Lair, Multitexturing with the ATI Rage Pro," (7 pages) from ati.com web site (2000).

Efficient Command/Data Interface Protocol For Graphics, IBM TDB, vol. 36, issue 9A, Sep. 1, 1993, pp. 307–312.

Shade, Jonathan et al., "Layered Depth Images," Computer Graphics Proceedings, Annual Conference Series, pp. 231–242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of SIGGRAPH, pp. 269–276 (Aug. 8–13, 1999).

Whitepaper: Implementing Fog in Direct3D, Jan. 3, 2000, www.nvidia.com.

Akeley, Kurt, "Reality Engine Graphics", 1993, Silicon Grphics Computer Systems, pp. 109–116.

White paper, Dietrich, Sim, "Dot Product Texture Blending and Per–Pixel Lighting" (Dec. 3, 1999).

White paper, Dietrich, Sim, "Vertex Blending under DirectX 7 for the GeForce 256" (Jan. 5, 2000).

Slide Presentation, Sébastien Dominé, "nVIDIA Mesh Skinning, OpenGI".

Singh Karan et al., "Skinning Characters using Surface–Oriented Free–Form Deformations," Toronto, Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages, (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W–Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic texture Filtering in OpenGL, posted Jul. 17, 2000, www.nvidia.com.

Whitepaper: Mapping Texels to Pixels in D3D, posted Apr. 4, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.

VisionTek, "GeForce2 GS Graphics Processing Unit", ©2000, www.visiontek,com.

Jim Bushnell et al. "Advanced Multitexture Effects With Direct3D and OpenGL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, ©1999.

Nikkei Shimbun, "Sony Making SME, Chemical and SPT into Wholly–Owned Subsidiaries", Mar. 9, 1999.

AM News: Japanese Developers Not All Sold on PS2, Next Generation, Mar. 16, 1999.

Sony To Turn PlayStation Maker Into Wholly Owned Unit–Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Every Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II ", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug., 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov. 10, 2000.

John Schlag, Fast Embossing Effects on Raster Image Data, Graphics Gem IV, Edited by Paul S. Heckbert, Computer Science Department, Carnegie, Mellon University, Academic Press, Inc., 1994, pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–141.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000 www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000 www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeFore 256 Overview, Nov. 12, 1999, www.nvidia.com.

Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com
Duke, "Dreamcast Technical Specs", Sega Dreamcast Review, Sega, Feb. 1999, www.game-revolution.com.
Marlin Rowley, "GeFoce 1 & 2 GPE Speed Tests", May 11, 2000, www.g256.com.
"Dreamcast: The Full Story", Next Generation, Sep. 1998.
DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision–Wesley Publishing Co., 1993.
"Procedural Elements for Computer Graphics," Second Edition, David F. Rogers, McGraw Hill, 1998.
"Real–Time Rendering," Tomas Molleir, Eric Haines, AK Peters, 1999.
"Computer Graphics, Principles and Practice," Second Edition, The Systems Programming Series, Foley van Dam, Fiener, Hughes, Addison Wesley, 1990.
"Principles of Three–Dimensional Computer Animation", Revised Edition, Michael O'Rourke, W.W. Norton & Company, 1998.

* cited by examiner

Fig. 5  EXAMPLE GRAPHICS PROCESSOR FLOW

Fig. 6  EXAMPLE STITCHED TEXTURE COORDINATE GENERATION AND TEXTURING PIPELINE

EXAMPLE TRANSFORM UNIT IMPLEMENTATION

US 6,700,586 B1

LOW COST GRAPHICS WITH STITCHING PROCESSING HARDWARE SUPPORT FOR SKELETAL ANIMATION

This application claims the benefit of U.S. Provisional Application No. 60/226,914, filed Aug. 23, 2000, the entire content of which is hereby incorporated by reference in this application.

FIELD OF THE INVENTION

The present invention relates to computer graphics, and more particularly to interactive graphics systems such as home video game platforms. Still more particularly, to systems and methods for providing skinning or stitching (e.g., to support skeletal animation/inverse kinematic techniques) in a low cost graphics system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as. for example, the Nintendo 64® and various 3D graphics cards now available for personal computers. It is now possible to interact with exciting 3D animations and simulations on relatively inexpensive computer graphics systems in your home or office.

A problem graphics system designers have confronted is how to efficiently model and render realistic looking animations in real time or close to real time. To achieve more interesting dynamic animation, a number of video and computer games have used a technique called inverse kinematics to model animated people and animals. Inverse kinematics allows a graphics artist to model animated objects in a hierarchical way so that movement of one part of the object causes another, connected part of the object to move.

For example if you raise your arm, you know your hand will move with your arm, and that your fingers will move with your hand. For example, inverse kinematics allows the animator to connect the torso, upper arm, lower arm, hand and fingers of a computer model so that moving the hand will cause the lower arm to move, moving the lower arm will cause the upper arm to move, etc. This is intuitive in the real world, but not all models behave this way in the world of animation.

The hierarchical model of an inverse kinematics model is sometimes called a skeleton, with each part of the skeleton being called a bone. The bones don't need to accurately model real bones in terms of their shape—they can be rigid line segments. To create images using such a kinematic skeletal model, one usually attaches "skin" surfaces to each of the bones. Once the "skin" surfaces are attached, they can automatically follow the movement of the bones when the bones are moved. By modeling a human or animal as a skeleton of interconnected bones (i.e., the same way that real human beings and animals are constructed), it is possible to achieve realistic, natural-looking motion. Game animators have been able to achieve remarkably realistic animated motion using such techniques.

One weakness of skeletal animation is the way it handles joints between bones. Generally each bone is rigid, and its movement is defined by a transform. If the transforms cause the joint to bend, an unsightly gap can be created. For example, the elbow where the upper and lower arms of an animated character meet, or the shoulder where the character's upper arm meets its torso ought to appear as natural as possible across a wide range of motion. Unnatural gaps at these points of connection mav destroy the illusion of realism.

The skin and flesh of real humans and animals at the intersection (joints) between bones is actually attached to and influenced by each of the various intersecting bones. For example if you "make a muscle" by closing your elbow, you will notice that the skin and flesh of your upper arm is influenced not only by your lower arm position/movement but also by your upper arm position/movement. If surfaces in joint regions of animated models are influenced by only a single bone, then some unsightly deformations may result—degrading the realism and impact of the animation. People are relatively unforgiving when it comes to evaluating the realism of animated human models. The more realistic the animated model, the more you will notice (and perhaps be dissatisfied with) unnatural or unrealistic characteristics of the model's appearance.

This weakness can be overcome using a technique called skinning, which adjusts and blends the positions of the vertices around the joint to create a continuous, flexible skin covering surface that provides a smooth transition between "bones" where the bones meet one another. This transitional "skin" surface can adapt to the different relative positions of two or more intersecting "bones" across a range of positions and relative motions. The resulting effect can significantly add to the illusion of realism.

On a more detailed level, the skin is typically defined by a mesh of vertices. Skinning is generally accomplished by allowing the position of each vertex in the mesh to be influenced by the movement of more than one bone in the skeletal animation model. The influence of different bones can be determined by assigning them different weights in computing the skin vertex position. A model can be animated by defining the movement of its skeleton, and the movements of the vertices that define the skin can be generated automatically (e.g., mathematically) by the graphics system.

Mathematical functions called matrix transformations are usually used to compute the location of each vertex in each frame of a skeletal animation. A separate transformation matrix is typically used for each bone that influences a given vertex. For example, if a skin vertex is located near the intersection of two bones, two transformation matrices are usually required—one for each of the two bones that influence that vertex. In order to make joints that flex naturally, it is desirable to allow the weightings of each matrix to vary for each vertex. Different vertex weightings for each vertex around a joint allow the vertex skin mesh to blend gradually from one bone to another ("vertex skinning").

Such vertex skinning techniques for modeling animated objects have been quite successful in providing a high degree of realism. Many high end animation rendering engines and modeling tools support such techniques. However, one problem with skinning is that the matrix transformations required for vertex skinning are very computationally intensive. To provide surface information for skinning/stitching, you normally need multiple interpolation points between two vertex locations. This implies the need for additional unique transformations per texture coordinate based off a single vertex specification—and unique texture transformations applied to the geometry or normal per texture. Thus, a plurality of matrix multiplications are required to accurately transform the skinning surface. The complexity increases with each additional matrix used.

Matrix multiplications are of course commonplace in graphics rendering systems. For example, it is common to provide matrix multiplication to transform model parameters from one space to another (e.g from modeling space to eye space) in order to project a 3D object representation onto a 2D viewing plane. However, real time systems typically minimize the number of matrix multiplications they perform. This is because each matrix multiplication can take many processor cycles if computed in software, and matrix multiplication hardware can require large amounts of "real estate" on a graphics chip. For this reason, there has not been much skinning support available in low cost real time rendering systems such as home video game platforms and inexpensive personal computer graphics accelerator cards. While the general purpose processor of such systems can be used to perform the skinning matrix multiplication calculations, such calculations are usually so time-consuming that the animator must sacrifice image complexity or speed performance if he or she wants skinning effects.

The present invention provides a solution to this problem In accordance with one aspect of this invention, a low cost computer graphics system includes hardware support for a more limited version of skinning called "stitching." Stitching allows a surface to be transformed based on two per-vertex values corresponding to different vertices. An additional interpolation/matrix multiplication provides a limited (piecewise linear) version of skinning ("stitching") that does not slow down the rendering pipeline.

In accordance with an aspect of this invention, a real time graphics rendering system includes a pair of matrix multiplication dot product computational elements. The first dot product computational element in the cascade can be used in a conventional manner to perform a modelview (or other) transformation. The second dot product computation element can be used to perform an additional interpolation to provide stitching. The two dot product computation elements can operate successively on the same texture coordinate values to provide transformed "stitched" texture coordinates for use in texture mapping a skin surface onto a vertex mesh.

In accordance with another aspect provided by this invention, a normalization block is provided between the two dot product computation units. The normalization function helps to avoid distortions that could otherwise occur under certain circumstances, e.g., when surfaces are deformed.

The additional dot product computation unit and associated matrix memory and the normalization block are relatively compact and do not occupy much chip real estate. They are not capable of full skinning, but a piecewise linear approximation of skinning can nevertheless be used to provide realistic interconnections between "bones" of the skeletal animation model while relieving the game animation processor from performing skinning computations. The additional matrix multiplication computation unit does not adversely impact on rendering pipeline speed performance. Pipeline latency increases can be absorbed through buffering. The system allows per-vertex specification of transform matrix indices to permit selection of different transformation matrices on a vertex-by-vertex basis.

The second matrix multiplication computation unit provided in the example implementation can be used for applications other than stitching. For example, various types of environment and/or reflection mapping can be performed using this additional texture coordinate matrix transformation.

BRIEF DESCRIPTION OF THE DRAWINGS

These and other features and advantages provided by the invention will be better and more completely understood by referring to the following detailed description of presently preferred embodiments in conjunction with the drawings. The file of this patent contains at least one drawing executed in color. Copies of this patent with color drawing(s) will be provided by the Patent and Trademark Office upon request and payment of the necessary fee. The drawings are briefly described as follows.

DETAILED DESCRIPTION OF EXAMPLE EMBODIMENTS OF THE INVENTION

Figure 1:
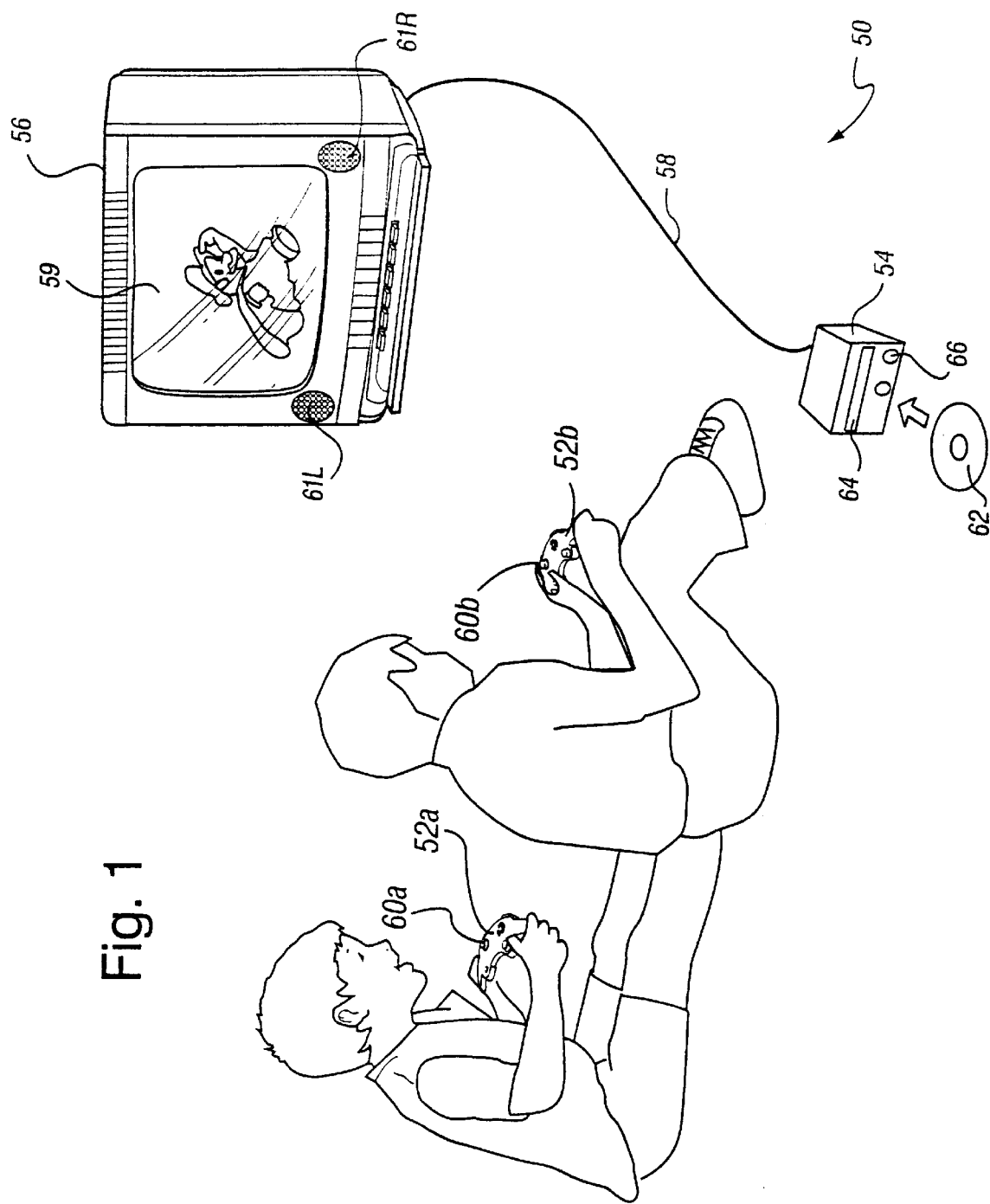
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications. time, In this example, system 50 is capable of processing interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world.

System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L. 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
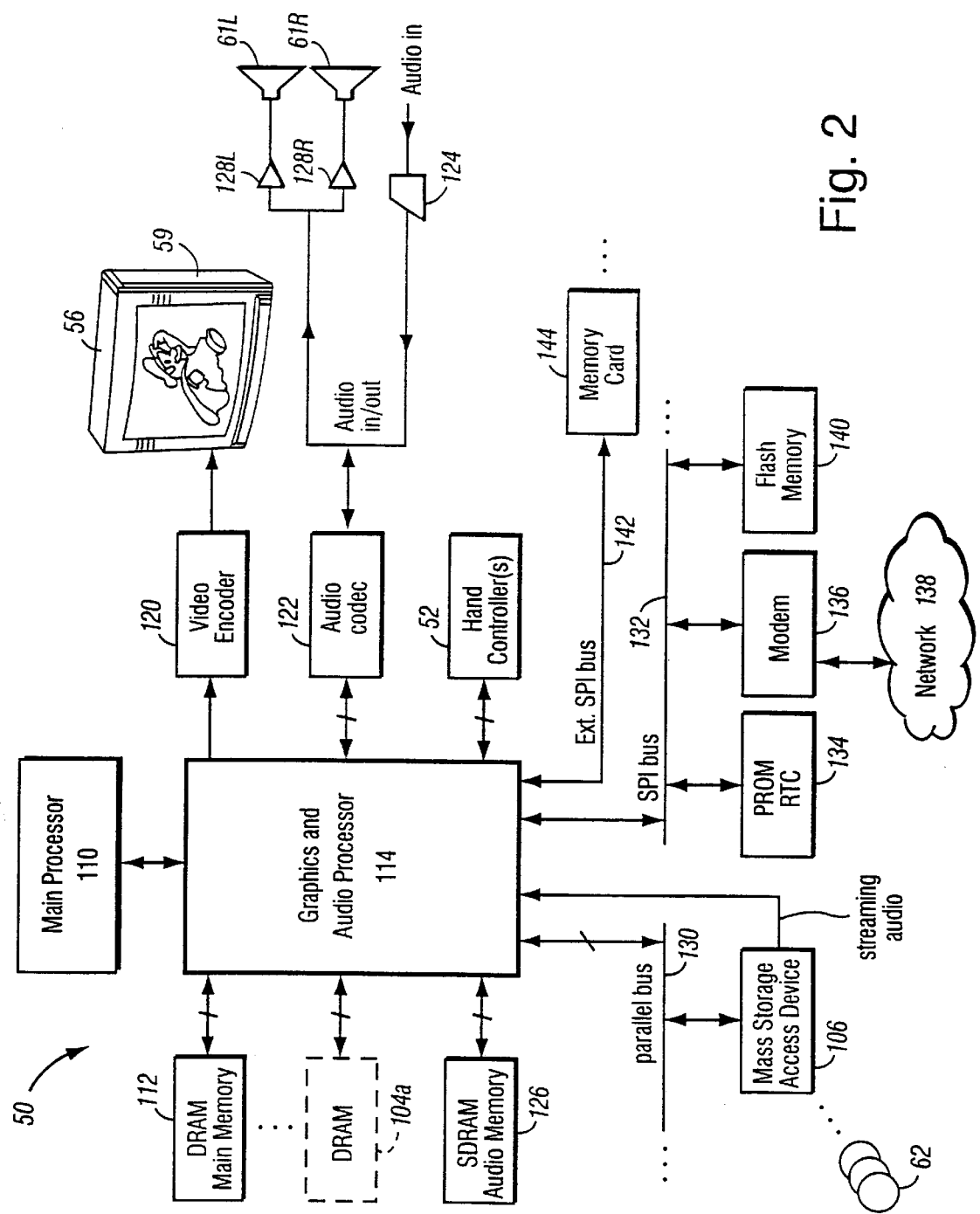
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L. 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
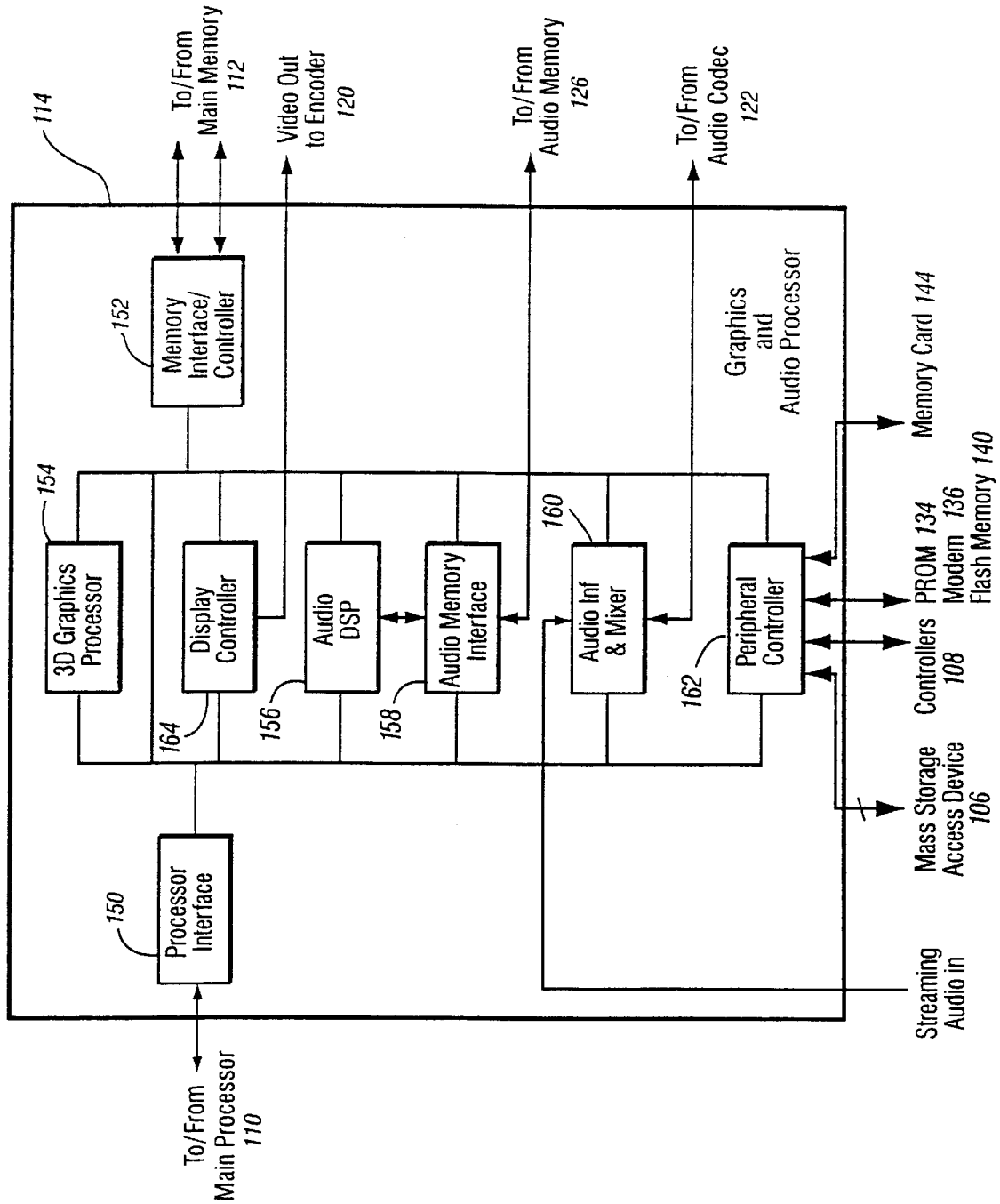
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154.
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
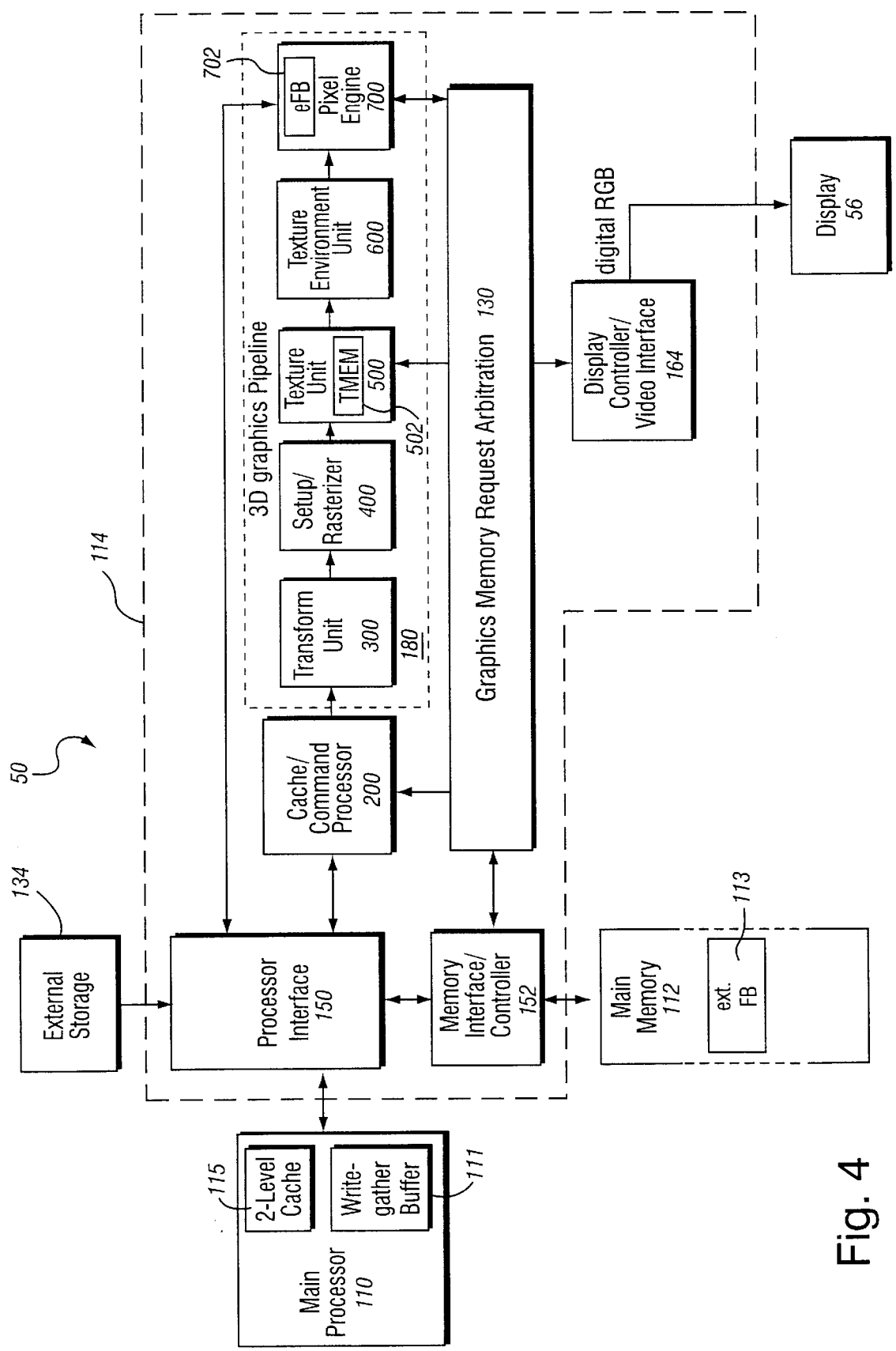
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
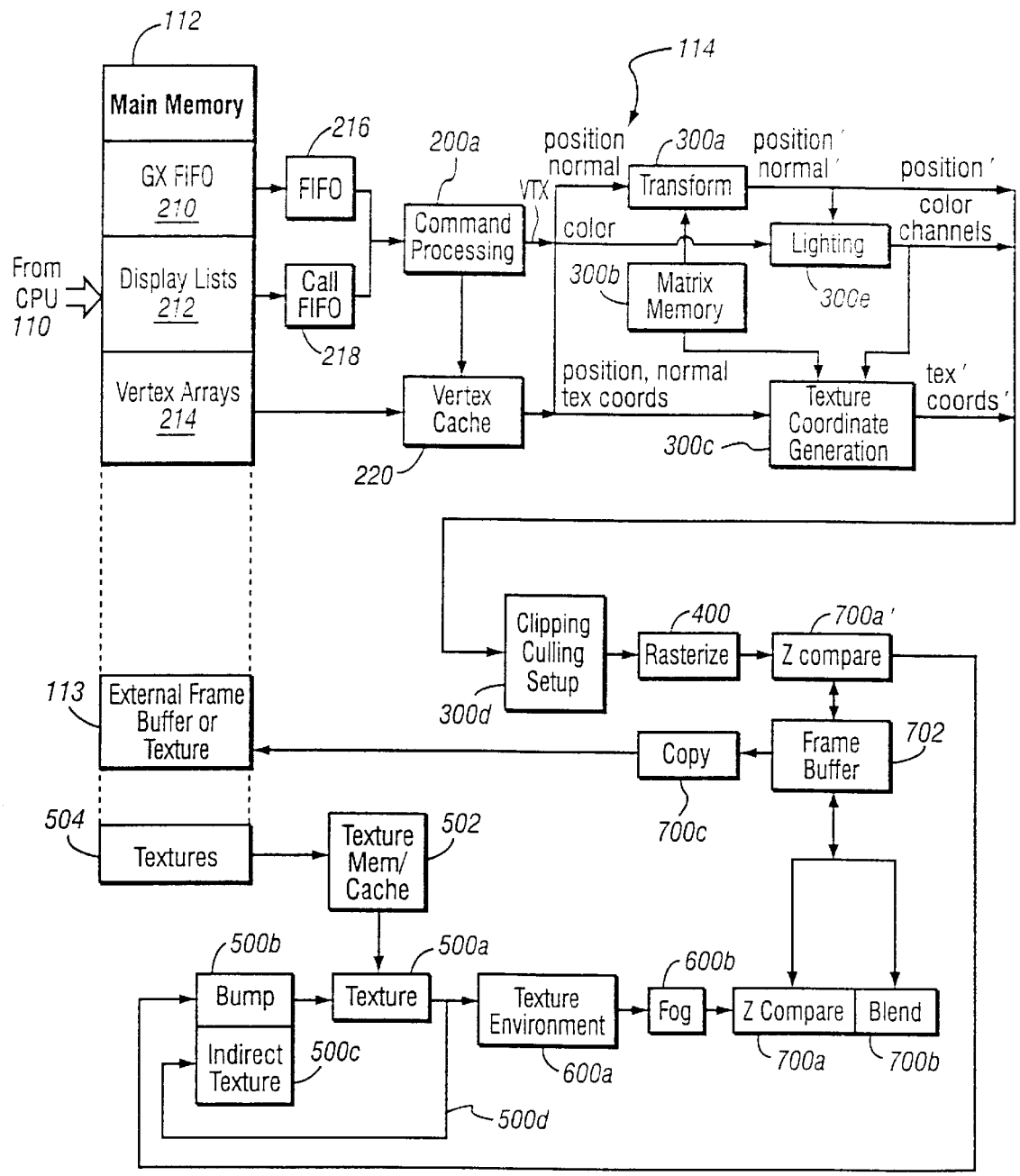
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400.

a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112.

texture processing (500a) including, for example, multi-texture handling, post-cache texture decompression, texture filtering, embossing, shadows and lighting through the use of projective textures, and BLIT with alpha transparency and depth, bump map processing for computing texture- coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending,.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information ran locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Antialiasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Dual Texture Coordinate Transform for Stitching and Other Applications

Figure 6:
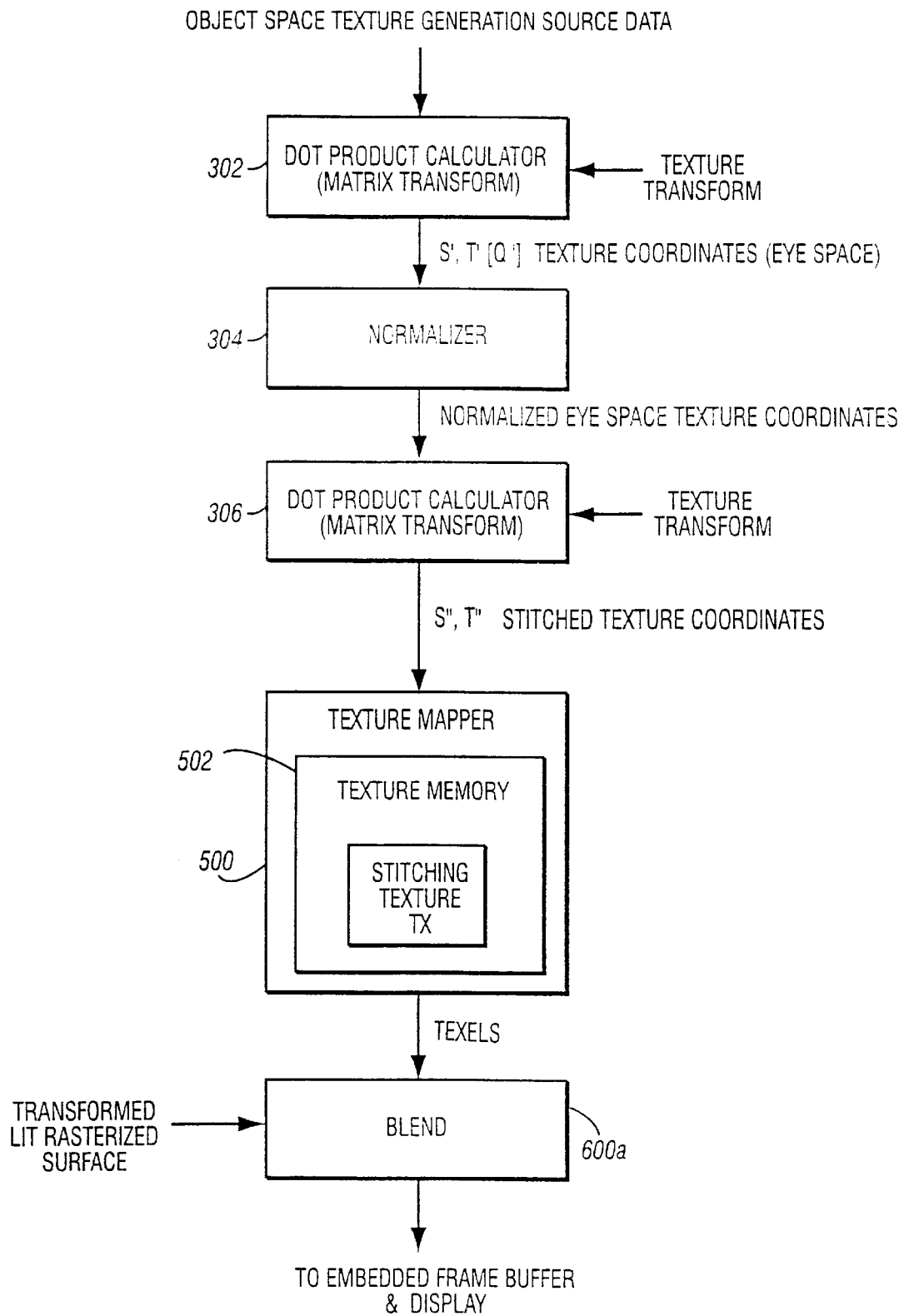
FIG. 6 shows an example stitched texture coordinate generation and texturing pipeline.

FIG. 6 shows an example stitched texture coordinate generation and texturing pipeline that can be implemented by system 50. In this example, transform unit 300 includes, among other things, a dot product calculator (matrix transform) 302, a normalizer 304, and a second dot product calculator (matrix transform) 306.

Dot product calculator 302 receives texture generation source data defining texture coordinates, geometry or normals pertaining to a surface in object space, and applies a matrix transformation based on a first vertex to produce (projected) texture coordinates s', t' (and optionally, q') in homogeneous eye space. The resulting texture coordinates so generated are optionally normalized by normalizer block 304, and applied to a second dot product calculator 306 that performs an additional matrix transformation on the texture coordinates. This additional matrix transformation interpolates the texture coordinate with respect to a second vertex to provide stitched texture coordinates s", t". These stitched texture coordinates may be applied to a texture mapper 500. Texture mapper 500 stores a stitching/skinning texture tx within texture memory 502. Texture mapper 500 maps texture tx onto a skinning surface defined by the vertices to provide texels for blending with rasterized pixels representing the transform rasterized surface. Blending is performed by texture environment block 600a in the example embodiment. The blended output is stored in embedded frame buffer 702 for display.

In more detail, transform unit 300 receives, from main processor 110, per-vertex data specifying a stitching surface to be imaged. The example embodiment transform unit 300 can accept such data in the form of geometry (x, y, z) specification of a vertex in object space, or it mav be the specification of the normals (i.e., Normal, Binormal, and Tangent) corresponding to the surface. Transform unit 300 performs a conventional modelview (or other) transformation to generate new geometry and/or new normals in homogeneous (e.g., eye) space.

Transform unit 300 provides a parallel operation to transform model space per-vertex source values (e.g., vertex geometry [x, y, z] or normals [$N_x$, $N_y$, $N_z$], or texture coordinates [s, t]) into corresponding texture coordinates. This texture coordinate generation dot product calculation (FIG. 6, block 302) generates texture coordinates in homogeneous (e.g., eye) space. The matrix used for the transformation could be the modelview matrix, or it could be some different texture transformation matrix. The matrix transformation performed by block 302 is on a per-vertex basis, and provides an appropriate set of texture coordinates s', t' [2'] for the particular vertex. Different transformation matrices may be selected through matrix indices specified with other vertex information.

Using one matrix per vertex allows boundary polygons to stretch to cover joints between "bones." However, the stretching is not necessarily smooth. Stitching usually requires more matrix transformations to achieve a smooth joint by interpolating between additional vertices. The preferred example implementation economizes by performing a single matrix multiply (block 306) in addition to the one (block 302) used for transforming the texture coordinates to homogeneous space. The second, cascaded matrix transformation performed by dot product calculator 306 performs a different texture transformation on the same texture coordinates—but this time for a second vertex. This provides an interpolation between the first vertex and the second vertex. For example, the second vertex may be a vertex on another "bone" of a skeletal animation model. The method of interpolation is not required to be linear (unlike typical skinning, applications). The second texture transformation 306 provides an ability to interpolate between these two vertices to provide texture coordinates specifying appropriate points between them. This provides a stitching interpolation of two vertices. Only one matrix is used to transform a given vertex, but different matrices can be used for different vertices.

While it is possible to recirculate dot product calculator 302 to apply a unique transformation for each output texture that is desired, the resulting decrease in speed performance resulting from an additional per-vertex delay for every vertex involving in stitching, is undesirable. To maximize performance, the preferred embodiment transform unit 300 provides a second hardware-based dot product calculator 306 cascaded with the first dot product calculator 302 which can take the first pass texture coordinates from dot product calculator 302 and generate a new set of transformed texture coordinates that can be used as stitched texture coordinates because they provide a future transformation to a second vertex.

We also provide a normalizer 304 between the first dot product calculator 302 and the second dot product calculator 306. Normalizer 304 can be used to eliminate distortions as the surface becomes deformed and the normals get stretched out. The texture coordinates generated by a model view transformation performed by block 302 may not be normalized—but the texture transform performed by block 306 may assume normalized inputs. It may therefore be desirable to apply an inverse normalization to get valid data for the second transform. The inverse normalization changes on a per-vertex basis, making it difficult for main processor 110 to provide appropriate texture transformation matrices that account for this effect. Normalizer 304 takes care of this by taking the texture coordinates s', t' (and the implied q' coordinate) generated by dot product calculator 302, and renormalizing these texture coordinates before applying them to the second dot product calculator 306.

Normalizer 304 guarantees that the computed vertex data is renormalized before it is applied to the normalized transformation performed by block 306 which does the interpolation to generate stitching coordinates of the texture. Normalizer 304 avoids surface warpage due to distortion of the normals. Without normalizer 304, stretching of the texture coordinates under certain circumstances would provide unattractive visual effects. However, in the example embodiment, normalizer 304 can be selectively enabled and disabled, and the normalizer may not be needed or used under all circumstances.

While the FIG. 6 pipeline is especially useful for stitching, it could be used for other applications such as environment maps and reflection maps. A first dot product calculator 302 can operate on any parameter the main processor 110 provides on a per-vertex basis (e.g., the normals, color, another set of texture coordinates, binormals, etc.). The transformation provided by dot product calculator 302 transforms the source to any desired position, while the second dot product calculator 306 applies a remapping from homogeneous space to texture coordinate space for texture generation. These techniques are general purpose and could be used for any type of texturing dependent on the geometry of the object (e.g., environment mapping, reflection mapping, and other applications).

More Detailed Example Embodiment

Figure 7:
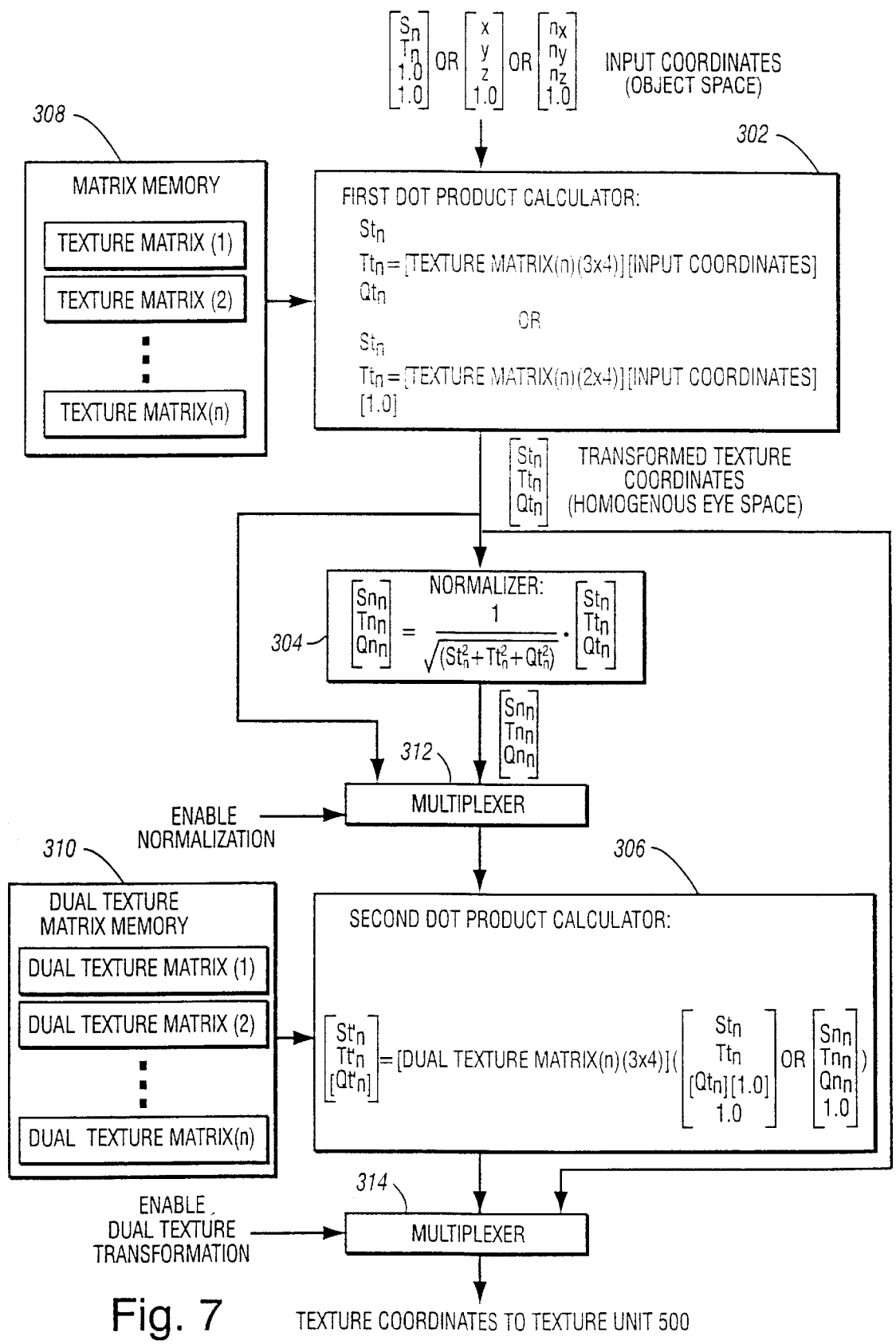
FIG. 7 shows a more detailed example stitched texture coordinate generator.

FIG. 7 shows a more detailed example stitching texture coordinate generation pipeline provided by transform unit 300. In this example, transform unit 300 can deal with a plurality of pairs of texture coordinates per vertex. First dot product calculator 302 transforms, using a corresponding plurality of texture matrices, each set of texture pairs/triplets or pairs of texture coordinates. The input coordinates can be any of the following quartets in the example embodiment:

$S_n$, $t_n$ 1.0, 1.0 texture coordinates from main processor 110, x, y, z, 1.0 vertex geometry in model space from main processor 110, $n_x$, $n_y$, $n_z$, 1.0 normals in model space.

The input coordinates in this example are in object coordinates (i.e., before any transformation). The (n) index is a texture based address for the texture matrix. A unique index n is used for each possible texture coordinate.

A matrix memory 308 is provided for storing the various texture transform matrices for use by block 302. Matrix selection is performed automatically by the hardware based on texture number.

Second dot product calculator 306 performs a "second pass" transformation to the texture coordinates. This additional transformation can be optionally applied to all texture coordinates. When enabled, this additional transformation is applied to all active regular texture coordinates in the example implementation.

The FIG. 7 pipeline can be operated with or without calculation of a third texture coordinate q. Calculation of q may be suppressed in order to achieve higher speed performance. When in its performance case (one regular texture with only two texture coordinates s, t), an implied $q_t$ equal 1.0 is used to compute $St'_n$ and $Tt'_n$, but no $Qt'_n$ is computed. In other cases, all three ($St'_n$, $Tt'_n$, $Qt'_n$) dual pass texture coordinates are computed—even if ST generation (implied Q) is specified for the first pass.

In the example embodiment, the second dot product calculator uses a separate set of texture transform matrices stored in a "dual texture" matrix memory 310 which is a separate memory area from matrix memory 308. The format of the matrices stored in memory 310 may be the same as the format of the matrices stored in memory 308 except that in the example embodiment, all of the "dual texture" transform matrices in matrix memory 310 have three rows (i.e., they are all 3×4 matrices). The per-vertex information provided by main processor 110 includes a matrix index per vertex—which allows selection of a different matrix and associated transformation on a per-vertex basis.

As mentioned above, an optional normalization of texture coordinates can be performed by block 304. Basically, each incoming texture triplet is scaled by the inverse of its norm. The selection between ($St_n$, $Tt_n$, $Qt_n$, 1.0) or ($Sn_n$, $Tn_n$, $Qn_n$, 1.0) can be done in a per texture coordinate basis. When a performance case (no Q coordinate) is used with normalization (which is not generally useful), no normalization occurs.

Normalizer 304 can, for example, be implemented using a 24-bit floating point calculator to do the squaring, and a limited precision 12-bit lookup to do the square root calculation and generate the normalization. This provides approximately 12 to 14 bits of precision, which is acceptable for 10 bits of texture coordinate precision and 8 bits of sub-pixel accuracy. Errors due to round off could be compensated for by using a smaller texture (e.g., 512×512 as opposed to 1024×1024). Of course, different implementations could use different precisions altogether.

In the example implementation, when the "dual pass" transform is not active (i.e., the second dot product calculator 306 is not enabled), this feature is completely disabled and does not affect any texture coordinates. This is illustrated in FIG. 7 by a multiplexer 314 that can select either the output of second dot product calculator 306 (when it is enabled) or the output of the first dot product calculator 302 (when the second dot product calculator is not enabled) for application as texture coordinates to texture unit 500.

In the particular example implementation, normalizer 304 and the second dot product calculator 306 are not available for geometry computation, nor can they be used for normal/ geometry calculations for lighting. In addition, the regular texture coordinates generated by the second dot product calculator 306 should, in general, be used for embossing. Accordingly, if embossing is enabled, multiplexer 314 in the example implementation always selects the output of the first dot product calculator 302. In addition, in the example implementation, the normalizer 304 and the second dot product calculator 306 are sourced from the output of the first dot product calculator 302. Of course, other implementations could provide different arrangements and additional flexibility.

Figure 8:
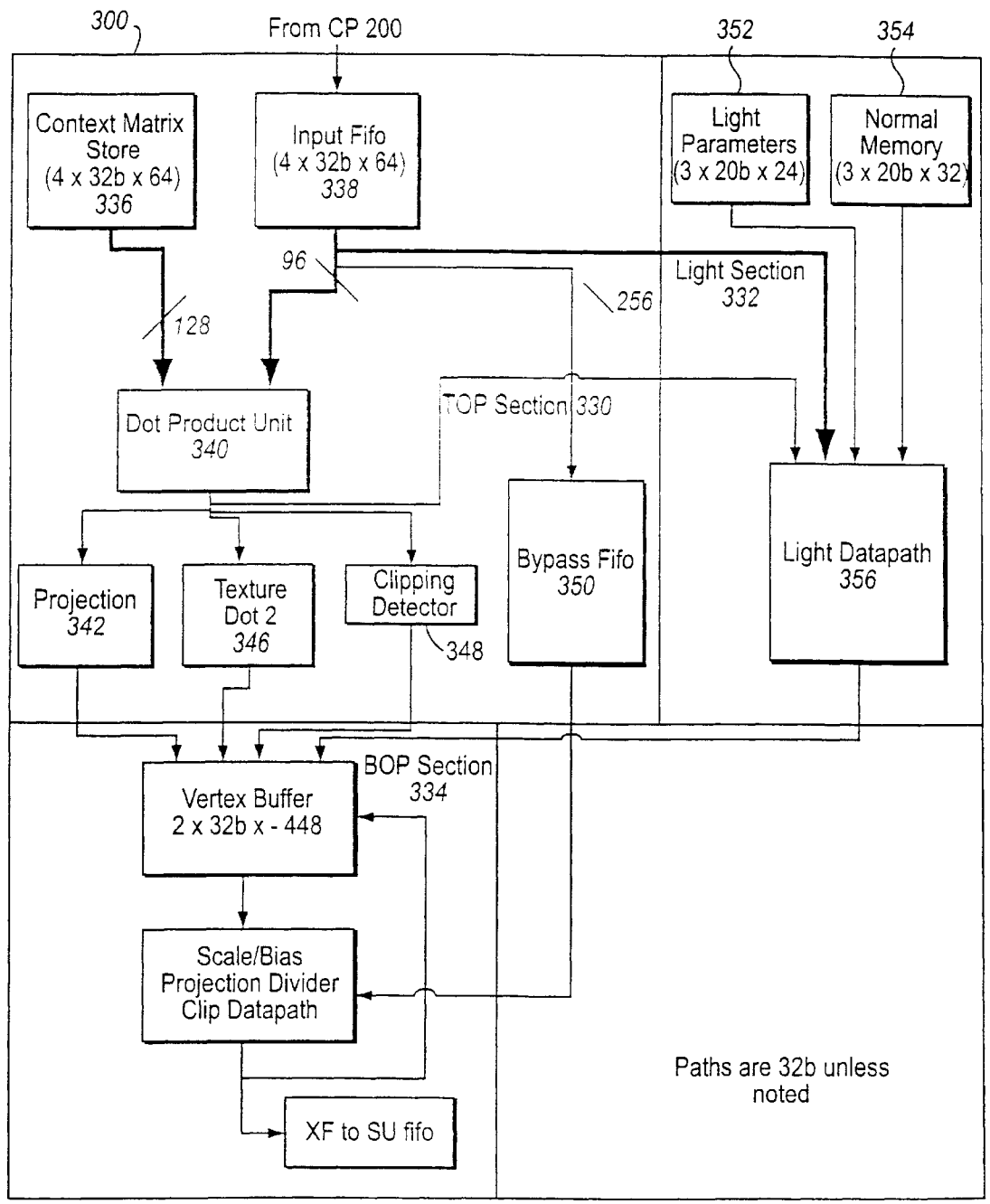
FIG. 8 shows an example block diagram of transform unit 300.

FIG. 8 shows an example overall high level block diagram of transform unit 300. For further details, see commonly assigned U.S. patent application Ser. No. 09/726,216 entitled "Achromatic Lighting Unit With Low Cost Improvements" and its corresponding provisional application, Ser. No. 60/227,007, filed Aug. 23, 2000, both of which are incorporated herein by this reference. The following are some example register definitions for various registers that main processor 110 may use to control transform unit 300 to perform stitching (among other things):

| Register Address | Definition | Configuration |
| --- | --- | --- |
| 0x1000 | Error | |
| 0x1001 | Diagnostics | |
| 0x1002 | State0 | Internal state register0 |
| 0x1003 | State1 | Internal state register1 |
| 0x1004 | Xf_clock | Enables power saving mode |
| | | 0: No power saving when idle |
| | | 1: Enable power saving when idle |
| 0x1005 | ClipDisable | Disables some or all of clipping |
| | | B[0]: When set, disables clipping detection (0 default) |
| | | B[1]: When set, disables trivial rejection (0 default) |
| | | B[2]: When set, disables cpoly clipping acceleration (0 default) |
| 0x1006 | Perf0 | Performance monitor selects |
| 0x1007 | Perf1 | Xform target performance register: |
| | | [6:0]: Xform internal target performance (Cycles/vertex) |
| 0x1008 | In VertexSpec | B[1:0]: Specifies host supplied color0 usage: |
| | | 0: No host supplied color information |
| | | 1: Host supplied color0 |
| | | 2: Host supplied color0 and color1 |
| | | B[3:2]: Specifies host supplied normal: |
| | | 0: No host supplied normal |
| | | 1: Host supplied normal |
| | | 2: Host supplied normal and binormals |

-continued

| Register Address | Definition | Configuration |
|---|---|---|
| | | B[7:4]: Specifies # of host supplied texture coordinates |
| | | 0: No host supplied textures |
| | | 1: 1 host supplied texture pair (S0, T0) |
| | | 2–8: 2–8 host supplied texturepairs |
| | | 9–15: Reserved |
| 0x1009 | NumColors | Specifies the number of colors to output: |
| | | 0: No xform colors active |
| | | 1: Xform supplies 1 color (host supplied or computed) |
| | | 2: Xform supplies 2 colors (host supplied or computed) |
| 0x100a | Ambient0 | 32b: RGBA (8b/comp) Ambient color0 specifications |
| 0x100b | Ambient1 | 32b: RGBA (8b/comp) Ambient color1 specifications |
| 0x100c | Material 0 | 32b: RGBA (8b/comp) global color0 material specifications |
| 0x100d | Material 1 | 32b: RGBF (8b/comp) global color1 material specification |
| 0x100e | Color0Cntrl | B[0]: Color0 Material source |
| | | 0: Use register (Material 0) |
| | | 1: Use CP supplied Vertex color 0 |
| | | B[1]: Color0 LightFunc |
| | | 0: Use 1.0 |
| | | 1: Use Illum0 |
| | | B[2]: Light0 is source |
| | | 0: Do not use light |
| | | 1: Use light |
| | | B[3]: Light1 is source |
| | | 0: Do not use light |
| | | 1: Use light |
| | | B[4]: Light2 is source |
| | | 0: Do not use light |
| | | 1: Use light |
| | | B[5]: Light3 is source |
| | | 0: Do not use light |
| | | 1: Use light |
| | | B[6]: Ambient source |
| | | 0: Use register Ambient0 register |
| | | 1: Use CP supplied vertex color 0 |
| | | B[8,7]: DiffuseAtten function |
| | | 0: Select 1.0 |
| | | 1: Select N.L, signed |
| | | 2: Select N.L clamped to [0,1.0] |
| | | B[9]: AttenEnable function |
| | | 0: Select 1.0 |
| | | 1: Select Attenuation fraction |
| | | B[10]: AttenSelect function |
| | | 0: Select specular (N.H) attenuation |
| | | 1: Select diffuse spotlight (L.Ldir) attenuation |
| | | B[11]: Light 4 is source |
| | | 0: Do not use Light |
| | | 1: Use light |
| | | B[12]: Light 5 is source |
| | | 0: Do not use Light |
| | | 1: Use light |
| | | B[13]: Light 6 is source |
| | | 0: Do not use Light |
| | | 1: Use light |
| | | B[14]: Light 7 is source |
| | | 0: Do not use Light |
| | | 1: Use light |
| 0x100f | Color1Cntrl | B[0]: Color Material source |
| | | 0: Use register (Material 1) |
| | | 1: Use CP supplied Vertex color 1 |
| | | B[1]: Color1 LightFunc |
| | | 0: Use 1.0 |
| | | 1: Use Illum1 |
| | | B[2]: Light0 is source |
| | | 0: Do not use light |
| | | 1: Use light |
| | | B[3]: Light1 is source |
| | | 0: Do not use light |
| | | 1: Use light |
| | | B[4]: Light2 is source |
| | | 0: Do not use light |
| | | 1: Use light |
| | | B[5]: Light3 is source |
| | | 0: Do not use light |
| | | 1: Use light |
| | | B[6]: Ambient source |
| | | 0: Use register Ambient1 register |
| | | 1: Use CP supplied vertex color 1 |
| | | B[8,7]: DiffuseAtten function |
| | | 0: Select 1.0 |
| | | 1: Select N.L, signed |
| | | 2: Select N.L clamped to [0,1.0] |
| | | B[9]: AttenEnable function |
| | | 0: Select 1.0 |
| | | 1: Select Attenuation fraction |
| | | B[10]: AttenSelect function |
| | | 0: Select specular (N.H) attenuation |
| | | 1: Select difftise spotlight (L.Ldir) attenuation |
| | | B[11]: Light 4 is source |
| | | 0: Do not use Light |
| | | 1: Use light |
| | | B[12]: Light 5 is source |
| | | 0: Do not use light |
| | | 1: Use light |
| | | B[13]: Light 6 is source |
| | | 0: Do not use light |
| | | 1: Use light |
| | | B[14]: Light 7 is source |
| | | 0: Do not use light |
| | | 1: Use light |
| 0x1010 | Alpha0Cntrl | B[0]: Color0 alpha Material source |
| | | 0: Use register (Material 0 alpha) |
| | | 1: Use CP supplied Vertex color 0 alpha |
| | | B[1]: Color0 alpha LightFunc |
| | | 0: Use 1.0 |
| | | 1: Use Illum0 |
| | | B[2]: Light0 alpha is source |
| | | 0: Do not use light |
| | | 1: Use light |
| | | B[3]: Light1 alpha is source |
| | | 0: Do not use light |
| | | 1: Use light |
| | | B[4]: Light2 alpha is source |
| | | 0: Do not use light |
| | | 1: Use light |
| | | B[5]: Light 3 alpha is source |
| | | 0: Do not use light |
| | | 1: Use light |
| | | B[6]: Ambient source |
| | | 0: Use register Ambient0 alpha register |
| | | 1: Use CP supplied vertex color 0 alpha |
| | | B[8,7]: DiffuseAtten function |
| | | 0: Select 1.0 |
| | | 1: Select N.L, signed |
| | | 2: Select N.L clamped to [0,1.0] |
| | | B[9]: AttenEnable function |
| | | 0: Select 1.0 |
| | | 1: Select Attenuation fraction |
| | | B[1-]: AttenSelect function |
| | | 0: Select specular (N.H) attenuation |
| | | 1: Select diffuse spotlight (L.Ldir) attenuation |
| | | B[11]: Light 4 is source |
| | | 0: Do not use Light |
| | | 1: Use light |
| | | B[12]: Light 5 is source |
| | | 0: Do not use Light |
| | | 1: Use light |
| | | B[13]: Light 6 is source |
| | | 0: Do not use Light |
| | | 1: Use light |
| | | B[14]: Light 7 is source |
| | | 0: Do not use Light |
| | | 1: Use light |
| 0x1011 | Alpha1Cntrl | B[0]: Color1 alpha Material source |
| | | 0: Use CP supplied Vertex color 1 alpha |
| | | B[1]: Color1 alpha LightFunc |

-continued

| Register Address | Definition | Configuration |
|---|---|---|
| | | 0: Use 1.0 |
| | | 1: Use Illum0 |
| | | B[2]: Light0 alpha is source |
| | | 0: Do not use light |
| | | 1: Use light |
| | | B[3]: Light1 alpha is source |
| | | 0: Do not use light |
| | | 1: Use light |
| | | B[4]: Light2 alpha is source |
| | | 0: Do not use light |
| | | 1: Use light |
| | | B[5]: Light3 alpha is source |
| | | 0: Do not use light |
| | | 1: Use light |
| | | B[6]: Ambient source |
| | | 0: Use register Ambient1 alpha register |
| | | 1: Use CP supplied vertex color 1 alpha |
| | | B[8:7]: DiffuseAtten function |
| | | 0: Select 1.0 |
| | | 1: Select N.L, signed |
| | | 2: Select N.L clamped to [0,2.0] |
| | | B[9]: AttenEnable function |
| | | 0: Select 1.0 |
| | | 1: Select Attenuation fraction |
| | | B[10]: AttenSelect function |
| | | 0: Select specular (N.H) attenuation |
| | | 1: Select diffuse spotlight (L.Ldir) attenuation |
| | | B[11]: Light 4 is source |
| | | 0: Do not use Light |
| | | 1: Use light |
| | | B[12]: Light 5 is source |
| | | 0: Do not use Light |
| | | 1: Use light |
| | | B[13]: Light 6 is source |
| | | 0: Do not use Light |
| | | 1: Use light |
| | | B[14]: Light 7 is source |
| | | 0: Do not use Light |
| | | 1: Use light |
| 0x1012 | DualTexTran | B[0]: When set(1), enables dual transform for all texture coordinates. When reset (0), disables dual texture transform feature |
| 0x1018 | MatrixIndex0 | B[5:0]: Geometry matrix index |
| | | B[11:6]: Tex0 matrix index |
| | | B[17:12]: Tex1 matrix index |
| | | B[23:18]: Tex2 matrix index |
| | | B[29:24]: Tex3 matrix index |
| 0x1019 | MatrixIndex1 | B[5:0]: Tex4 matrix index |
| | | B[11:6]: Tex5 matrix index |
| | | B[17:12]: Tex6 matrix index |
| | | B[23:18]: Tex7 matrix index |
| 0x101a | ScaleX | Viewport scale X |
| 0x101b | ScaleY | Viewport scale Y |
| 0x101c | ScaleZ | Viewport scale Z |
| 0x101d | OffsetX | Viewport offset X |
| 0x101e | OffsetY | Viewport offset Y |
| 0x101f | OffsetZ | Viewport offset Z |
| 0x1020 | ProjectionA | A parameter in projection equations |
| 0x1021 | ProjectionB | B parameter in projection equations |
| 0x1022 | ProjectionC | C parameter in projection equations |
| 0x1023 | ProjectionD | D parameter in projection equations |
| 0x1024 | ProjectionE | E parameter in projection equations |
| 0x1025 | ProjectionF | F parameter in projection equations |
| 0x1026 | ProjectOrtho | If set selects orthographic otherwise non-orthographic (Zh or 1.0 select) |
| 0x103f | NumTex | Number of active textures |
| 0x1040 | Tex0 | B0: Reserved |
| | | B1: texture projection |
| | | 0: (s,t): texmul is 2x4 |
| | | 1: (s,t,q): texmul is 3x4 |
| | | B2: input form (format of source input data for regular textures) |
| | | 0: (A, B, 1.0, 1.0) (used for regular texture source) |
| | | 1: (A, B, C, 1.0) (used for geometry or normal source) |
| | | B3: Reserved |
| | | B[6,4]: texgen type |
| | | 0: Regular transformation (transform incoming data) |
| | | 1: texgen bump mapping |
| | | 2: Color texgen: (s,t)=(r.g:b) (g and b are concatenated), color0 |
| | | 3: Color texgen: (s,t)=(r.g:b) (g and b are concatenated). color 1 |
| | | B[11:7]: regular texture source row: Specifies location of incoming textures in vertex (row specific) (i.e.: geometry is row0, normal is row1, etc . . .) for regular transformations (refer to the table below) |
| | | B[14:12]: bump mapping source texture: n: use regular transformed tex(n) for bump mapping source |
| | | B[17:15]: Bump mapping source light: n: use light #n for bump map direction source (10 to 17) |
| 0x1041 | Tex1 | SeeTex0 |
| 0x1042 | Tex2 | SeeTex0 |
| 0x1043 | Tex3 | SeeTex0 |
| 0x1044 | Tex4 | SeeTex0 |
| 0x1045 | Tex5 | SeeTex0 |
| 0x1046 | Tex6 | SeeTex0 |
| 0x1047 | Tex7 | SeeTex0 |
| 0x1050 | Dual Tex0 | B[5:0]: Indicates which is the base row of the the dual transform matrix for regular texture coordinate0. |
| | | B[7:6]: Not used. |
| | | B[8]: specifies if texture coordinate should be normalized before send transform. |
| 0x1051 | DualTex1 | See DualTex0 |
| 0x1052 | DualTex2 | See DualTex0 |
| 0x1053 | DualTex3 | See DualTex0 |
| 0x1054 | DualTex4 | See DualTex0 |
| 0x1055 | DualTex5 | See DualTex0 |
| 0x1056 | DualTex6 | See DualTex0 |
| 0x1057 | DualTex7 | See DualTex0 |

Example API Calls

The following are example relevant application programmer interface calls that can be used to control stitching:

| Function | Parameters | Description |
|---|---|---|
| GXLoadPosMtxImm | matrix | different matrix sent down for each tube segment |
| | matrix destination | GX_PNMTX0-GX_PNMTX9 |
| GXLoadNrmMtxImm | matrix | different matrix sent down for each tube segment |
| | matrix destination | GX_PNMTX0-GX_PNMTX9 |
| GXMatrixIndex1u8 | matrix source | GX_PNMTX0-GX_PNMTX9 |

GXLoadPosMtxImm

Description

This function is used to load a 3×4 model view matrix mtxPtr into matrix memory at location id. This matrix can be used to transform positions in model space to view space, either by making the matrix the current one (see GXSetCurrentMtx), or by setting a matrix id for each vertex. The parameter mtxPtr is a pointer to a 3×4 (row×column) matrix. The parameter id is used to refer to the matrix location, enumerated by GXPosNrmiMtx, in matrix memory.

You can also load a normal matrix (GXLoadkNrmMtxImm or GXLoadNrmMtxIndx) to the same id. Generally, the normal matrix will be the inverse transpose of the position matrix. The normal matrix is used during vertex lighting. In cases where the modelview and inverse transpose of the modelview (excluding translation) are the same, you can load the same matrix for both position and normal transforms.

The matrix is copied from DRAM through the CPU cache into the Graphics FIFO, so matrices loaded using this function are always coherent with the CPU cache.

Arguments

| | |
|---|---|
| mtxPtr | Specifies a pointer to the matrix data. |
| id | Specifies the matrix name. Accepted values are enumerated by GXPosNrmMtx. |

Example usage:
void GXLoadPosMtxImm(
    f32 mtxPtr[3] [4],
    u32 id)

GXLoadNrmMtxImm

Description

This function is used to load a 3×3 normal transform matrix into matrix memory at location id from the 3×4 matrix mtxPtr. This matrix is used to transform normals in model space to view space, either by making it the current matrix (see GXSetCurrentMtx), or by setting a matrix id for each vertex. The parameter mtxPtr is a pointer to a 3×4 (row×column) matrix. The translation terms in the 3×4 matrix are not needed for normal rotation and are ignored during the load. The parameter id, enumerated by GXPosNrmMtx, is used to refer to the estimation matrix location in matrix memory.

You can also load a position matrix (GXLoadPosMtxImm) to the same id. Normally, the normal matrix will be the inverse transpose of the position (modelview) matrix and is used during vertex lighting. In cases where the modelview and the inverse transpose of the modelview matrix (excluding translation) are the same, the same matrix can be loaded for both normal and position matrices.

To load a normal matrix from a 3×3 matrix, use GXLoadNrmMtxImm3×3.

The matrix data is copied from main memory or the CPU cache into the Graphics FIFO, so matrices loaded by this function are always coherent with the CPU cache.

Arguments

| | |
|---|---|
| mtxPtr | Specifies a pointer to the matrix data. |
| id | Specifies the matrix name. Accepted values are enumerated by GKPosNrmMtx. |

Example usage:
void GXLoadPosMtxImm(
    f32 mtxPtr[3] [4],
    u32 id)

GXMatrixIndex

Description

This function is used to specify matrix index data for a vertex. It can only be called between GXBegin and GXEnd. The matrix index specifies which matrix (previously loaded into matrix memory, see GXLoadPosMtxImm, GXLoadNrmMtxImm and GXLoadTexMtxImm) to use to transform this vertex's data.

To use this function for a vertex, you first enable a matrix index in the current vertex descriptor. The current vertex descriptor is set using GXSetVtxDesc. There is no need to set a vertex attribute format (GXSetVtxAttrFmt) because the index must be an unsigned 8-bit number. Both GXMatrixIndex1u8 and GXMatrixIndex1×8 are identical.

The order in which vertex functions must be called is specified by GXSetVtxDesc. Each vertex must send attributes (positions, colors, normals, etc.) in the specified order to guarantee proper interpretation by the graphics hardware.

The GXMatrixIndex1u8 (GXMatrixIndex1×8) is implemented as an inline function for optimal performance. The GXMatrixIndex1u8 (GXMatrixIndex1×8) is implemented as a regular function so the library can verify the correct order of vertex function calls between GXBegin/GXEnd (a common source of errors).

Arguments

| | |
|---|---|
| index | An unsigned 8-bit index into matrix memory. This number indicates the first row of matrix memory where the matrix was loaded. |

Example usage:
void GXMatrixIndex1u8 (u8 index);
void GXMatrixIndex1×8 (u8 index);

Supported Functions:

| | GX_Direct | GX_INDEX8, GX_INDEX16 |
|---|---|---|
| GX Position | GXPosition3f32, GXPosition3u8 GXPosition3s8, GXPosition3u16, GXPosition3s16 GXPosition2f32, GXPosition2u8 GXPosition2s8, GXPosition2u16, GXPosition2s16 | GXPosition1x16, GXPosition1x8 |
| GXColor | GXColor4u8, GXColor3u8, GXColor1u32. GXColor1u16 | GXColor1x16, GXColor1x8 |
| GX Normal | GXNormal3f32, GXNormal3s16, GXNormal3s8 | GXNormal1x16 GXNormal1x8 |
| GXTex Coord | GXTexCoord2f32, GXTexCoord2s16, GXTexCoord2u16, GXTexCoord2s8, GXTexCoord2u8 GXTexCoord1f32, GXTexCoord1s16, GXTexCoord1u16, GXTexCoord1s8, GXTexCoord1u8 | GXTexCoord1x16, GXTexCoord1x8 |
| GXMatrix Index | GXMatrixIndex1u8/ GXMatrixIndex1x8 | None |
| GXVertex | None | None |

GXSetVtxDesc

Example Usage:
void GXSetVtxDesc(GXAttr attr, GXAttrType type);

Description

This function sets the type of a single attribute (attr) in the current vertex descriptor. The current vertex descriptor defines which attributes are present in a vertex and how each attribute is referenced. The current vertex descriptor is used by the Graphics Processor (GP) to interpret the graphics command stream produced by the GX API. In particular, the current vertex descriptor is used to parse the vertex data that is present in the command stream.

Attributes

GX_VA_POSMTXIDX

The attr parameter names the attribute. The attribute GX_VA_POSMTXIDX is used to specify a matrix index (8 bits) per vertex. This index will be used to index a position (and normal, if lighting) matrix in matrix memory. Providing a matrix index per vertex allows character skinning.

GX_VA_TEX0MTXIDX-GX_VA_TEX7MTXIDX

You may also specify a texture matrix index per vertex, using GX_VA_TEX0MTXIDX-GX_VA_TEX7MTXIDX. Each matrix index is an 8-bit value that is the row address of the texture matrix in matrix memory. The matrix index number corresponds to the generated texture coordinate used in GXSetTexCoordGen. For example, GX_VA_TEX3MTXIDX inicates the matrix to use when generating GX_TEXCOORD3. You provide texture matrix indices in sequential order, but it is possible to skip matrix indices. For example, you can provide GX_VA_TEX0MTXIDX and GX_VA_TEX2MTXIDX. The texture coordinate GX_TEXCOORD1 will use the matrix specified in GXSetTexCoordGen. In other words, the default texture matrix index provided by GXSetTexCoordGen will be overridden by a per-vertex matrix index if one is provided. Providing texture matrix indices per vertex may be used when generating texture coordinates from a skinned (stitched) model, for example, when reflection-mapping a skinned model.

GX_VA_POS

The GX_VA_POS attribute is used for position. Position is the only attribute that is required for each vertex.

GX_VA_NRM, GX_VA_NBT

The GX_VA_NRM attribute is used for 3 element normals. GX_VA_NBT is enabled when three normals are needed (normal, binormal, and tangent), such as for bump mapping. GX_VA_NRM and GX_VA_NBT should not be enabled at the same time. GX_VA_NRM and GX_VA_NBT will share the same format in the vertex attribute format, see GXSetVtxAttrFmt.

Attribute Types

The attribute type GX_NONE indicates that no data or index will be sent for this attribute. The attribute type GX_DIRECT indicates that the data for this attribute will be passed directly in the graphics command stream (as opposed to being indexed). The attribute type GX_INDEX8 indicates that an 8-bit index will be sent in the command stream. The 8-bit index 0xff is a reserved value. It is used to disable the vertex in the graphics processor. You can use this to "turn off" certain triangles in a display list, without having to regenerate a new display list. The graphics processor will use the index, along with the attribute's array base pointer and stride (see GXSetArray), to look up the attribute's data. The GX_INDEX16 attribute type indicates a 16-bit index is present in the vertex data. The 16-bit index 0xffff is a reserved value used to disable the vertex in the graphics processor.

GXInit clears the current vertex descriptor using GXClearVtxDesc.

Arguments

| Attribute | Ascending order in a vertex | Description |
| --- | --- | --- |
| GX_VA_PNMTXIDX | 0 | Position/Normal Matrix Index |
| GX_VA_TEX0MTXIDX | 1 | GX_TEXCOORD0 matrix index |
| GX_VA_TEX1MTXIDX | 2 | GX_TEXCOORD1 matrix index |
| GX_VA_TEX2MTXIDX | 3 | GX_TEXCOORD2 matrix index |
| GX_VA_TEX3MTXIDX | 4 | GX_TEXCOORD3 matrix index |
| GX_VA_TEX4MTXIDX | 5 | GX_TEXCOORD4 matrix index |
| GX_VA_TEX5MTXIDX | 6 | GX_TEXCOORD5 matrix index |
| GX_VA_TEX6MTXIDX | 7 | GX_TEXCOORD6 matrix index |
| GX_VA_TEX7MTXIDX | 8 | GX_TEXCOORD7 matrix index |
| GX_VA_POS | 9 | Position |
| GX_VA_NRM or GX_VA_NBT | 10 | Normal or Normal/Binormal/Tangent |
| GX_VA_CLR0 | 11 | Color 0 |
| GX_VA_CLR1 | 12 | Color 1 |
| GX_VA_TEX0 | 13 | Texture Coordinate 0 |
| GX_VA_TEX1 | 14 | Texture Coordinate 1 |
| GX_VA_TEX2 | 15 | Texture Coordinate 2 |
| GX_VA_TEX3 | 16 | Texture Coordinate 3 |
| GX_VA_TEX4 | 17 | Texture Coordinate 4 |
| GX_VA_TEX5 | 18 | Texture Coordinate 5 |
| GX_VA_TEX6 | 19 | Texture Coordinate 6 |
| GX_VA_TEX7 | 20 | Texture Coordinate 7 |

Example Image Results

Figure 9:
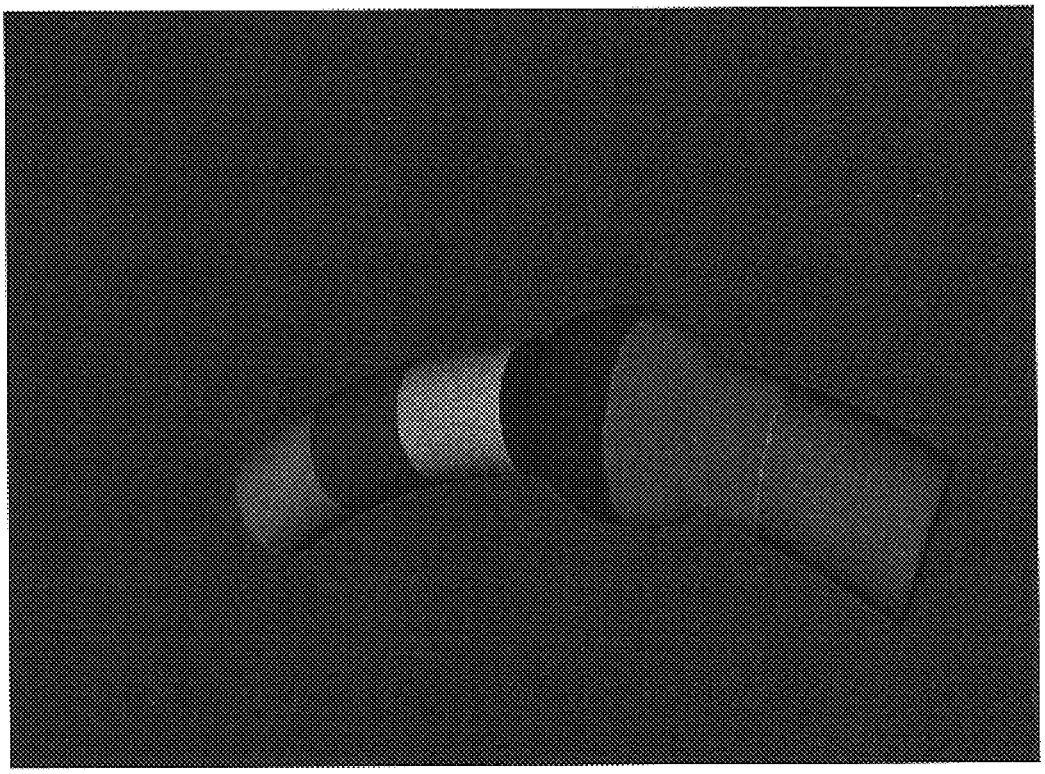
FIG. 9 shows example stitched imaging results provided by an example implementation.

FIG. 9 shows an example stitched image result provided by an example implementation.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or Macintosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 10A:
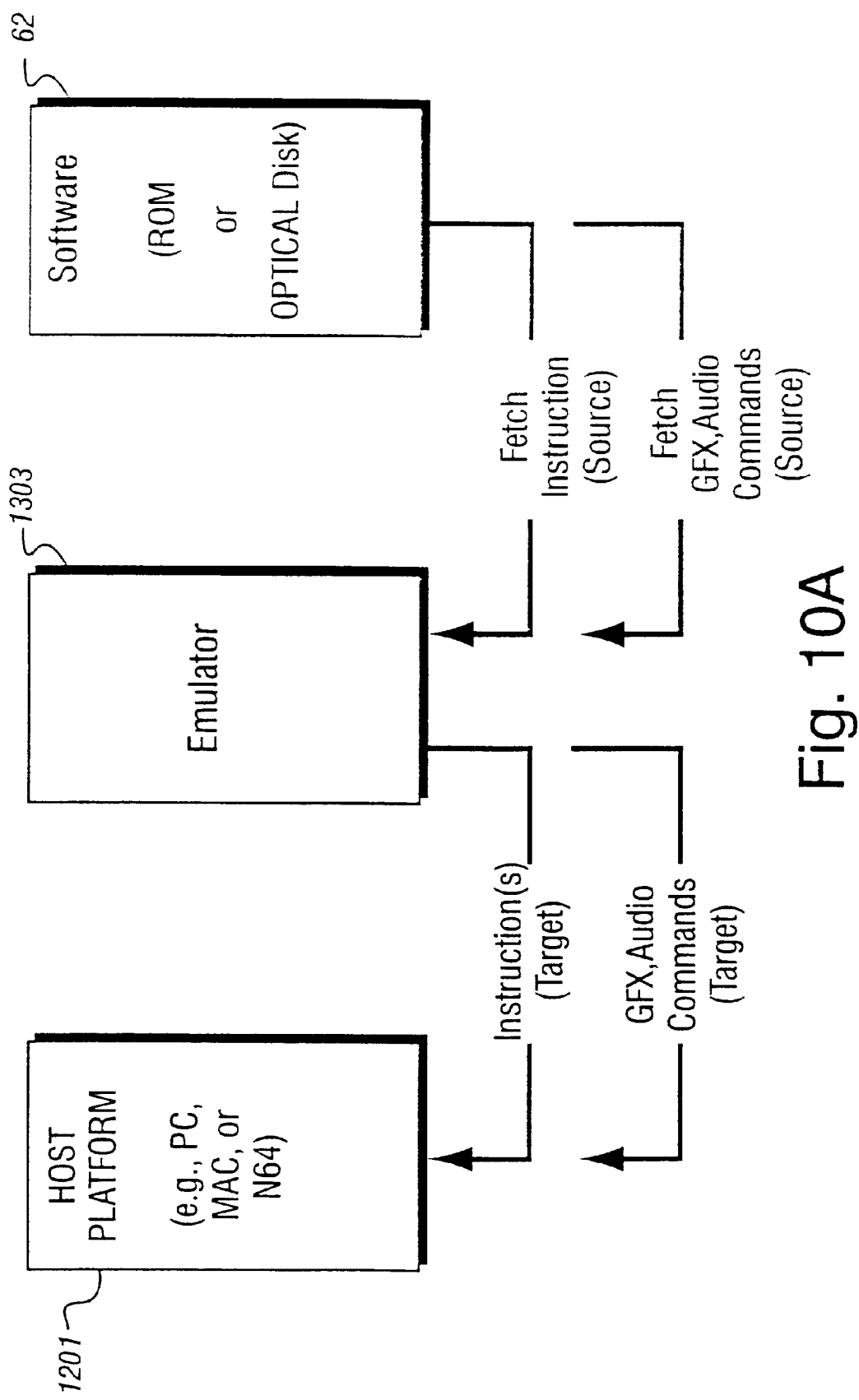
FIGS. 10A and 10B show example alternative compatible implementations.

FIG. 10A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 10B:
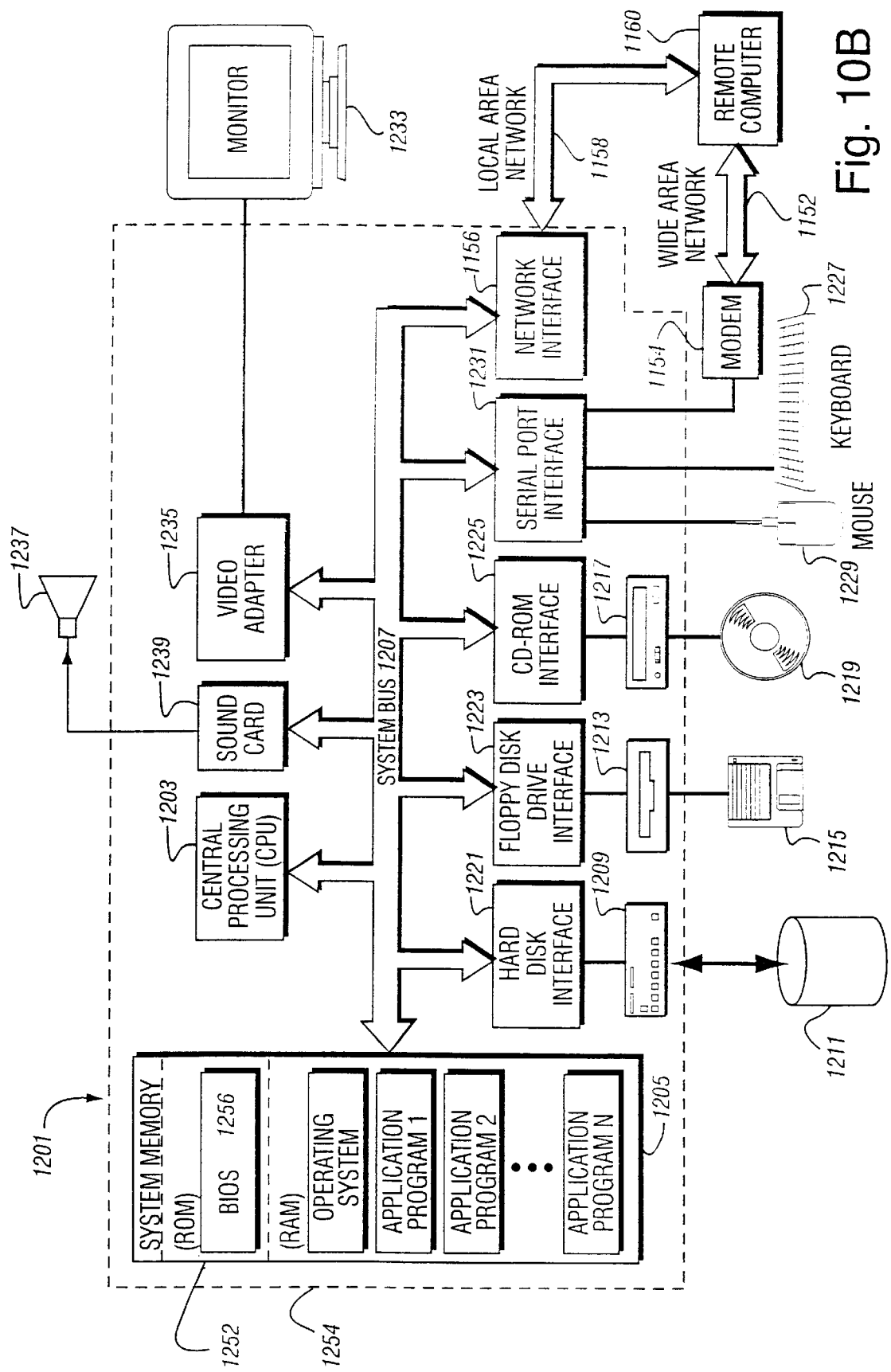

FIG. 10B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (RONM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Lnternet. Modem 1154, which mav be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

I claim:

1. A computer graphics system providing animated real-time displays, said computer graphics system including a graphics pipeline comprising:

a texture coordinate generator;

a texture transform unit coupled to said texture coordinate generator, said texture transform unit, in use, transforming texture coordinates for a texture mapping operation, and additional control circuitry within said graphics pipeline, said control circuitry controlling reuse of the texture transform unit to perform multiple per-vertex transformations for piecewise linear approximation interpolation between first and second vertices to provide stitching of a skin surface onto an animated vertex mesh, said control circuitry selecting different transformation matrices for different vertices.

2. The graphics pipeline of claim 1 wherein the texture transform unit comprises:

a first dot product computation unit performing a texture transformation on a first set of texture coordinates with respect to the first vertex to generate texture coordinates in homogeneous space; and a second dot product computation unit coupled in series with said first dot product computation unit, said second dot product computation unit performing a different texture transformation on the first set of texture coordinates with respect to the second vertex different from said first vertex to provide a piecewise linear interpolation between the first vertex and the second vertex.

3. The graphics pipeline of claim 1 further including a normalizer coupled between said first dot product computation unit and said second dot product computation unit, said normalizer reducing distortions as animated surfaces deform and associated normals get stretched out.

4. A computer graphics system providing animated displays in real time, said computer graphics system including:

a texture coordinate generator;

a transform unit for transforming texture coordinates generated by said texture coordinate generator for a texture mapping operation and performing the additional function of performing multiple per-vertex transformations for piecewise linear stitching of a skin surface onto an animated vertex mesh by interpolating between first and second vertices;

an image generator connected to the transform unit, the image generator generating an image of said animated display including said piecewise linear stitched surface in response to computations performed by the transform unit; and an embedded frame buffer storing the generated image for display.

5. Apparatus as in claim 4 wherein said transform unit includes cascaded matrix multiplication computations units, at least one of said cascaded matrix multiplication computation units being used for transforming a stitching texture relative to the second vertex.

6. Apparatus as in claim 4 wherein the transform unit includes a normalizer for normalizing texture coordinates associated with a stitching surface, said normalizer reducing distortions as animated surfaces deform and associated normals get stretched out.

7. A method of producing animated graphical displays in real time, comprising:

(a) generating texture coordinates;

(b) using a transform unit to transform texture coordinates wit respect to a first vertex in connection with a texture mapping operation that maps a texture into the image; and (c) re-using said transform unit to perform a further per-vertex transformations of said texture coordinates with respect to a second vertex to provide a piecewise linear stitched skin surface mapped onto said animated vertex mesh within the image.

8. A low cost home video game system for displaying real-time animated video games, said system comprising:

a texture mapper;

a texture coordinate generator;

a transform unit that transforms texture coordinates with respect to first vertices for application to the texture mapper; and stitching control circuitry that re-uses the transform unit to transform the already transformed texture coordinates with respect to second vertices different from said first vertices to provide per-vertex piecewise linear stitching to efficiently obtain a visual stitching effect that stitches skin surfaces onto animated vertex meshes.

* * * * *